(12) United States Patent
Yanagisawa et al.

(10) Patent No.: US 6,853,670 B2
(45) Date of Patent: Feb. 8, 2005

(54) LASER RESONATOR

(75) Inventors: Takayuki Yanagisawa, Tokyo (JP); Yoshihito Hirano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/329,471

(22) Filed: Dec. 27, 2002

(65) Prior Publication Data

US 2003/0202554 A1 Oct. 30, 2003

Related U.S. Application Data

(63) Continuation-in-part of application No. 09/814,115, filed on Mar. 22, 2001, now abandoned.

(30) Foreign Application Priority Data

Mar. 27, 2000 (JP) .................................. 2000-086605

(51) Int. Cl.[7] ................................................ H01S 3/08
(52) U.S. Cl. ............................ 372/101; 372/92; 372/98
(58) Field of Search ............................. 372/92, 98, 101

(56) References Cited

U.S. PATENT DOCUMENTS

| | | | |
|---|---|---|---|
| 3,426,294 A | 2/1969 | Koester | 331/94.5 |
| 3,777,280 A | 12/1973 | Pohl | 331/94.5 |
| 4,803,694 A | 2/1989 | Lee et al. | 372/98 |
| 5,003,543 A | 3/1991 | Morsell et al. | 372/5 |
| 5,199,042 A * | 3/1993 | Papetti et al. | 372/95 |
| 5,710,788 A * | 1/1998 | Werner | 372/99 |
| 5,877,892 A * | 3/1999 | Nakamura et al. | 359/426 |
| 5,946,090 A * | 8/1999 | Tashiro et al. | 356/326 |
| 5,991,317 A * | 11/1999 | Nighan et al. | 372/22 |
| 6,122,097 A | 9/2000 | Weston et al. | 359/345 |
| 6,172,823 B1 * | 1/2001 | Lehmann et al. | 359/834 |
| 6,421,166 B1 * | 7/2002 | Velsko et al. | 359/330 |
| 6,700,698 B1 * | 3/2004 | Scott | 359/347 |
| 2001/0021215 A1 * | 9/2001 | Bunting et al. | 372/70 |

OTHER PUBLICATIONS

Koechner, W., "Solid–State Laser Engineering", Springer Series In Optical Sciences, vol. 1, 4th Ed., 1995, Germany, pp. 195–199.

Siegman, A., "LASERS", University Science Books, Sausalito, CA., 1986, pp. 755–756.

T. Yanagisawa et al; "11–mJ, 15–Hz Single–Frequency Diode–Pumped Q–Switched Er, Phosphate glass laser"; Optics Letters, vol. 26, No. 16, Aug. 15, 2001, pp. 1264.

D.V. Willets and M.R. Harris, "*Attainment of Frequency Stable High–Energy Operation of a $CO_2$ TEA Laser by Use of a Telescopic Resonator*," IEEE Journal of Quantum Electronics, IEEE Inc. New York, US, vol. QE–21, No. 3, Mar. 1, 1985, pp. 188–191, XP000705462. ISSN: 0018–9197.

* cited by examiner

*Primary Examiner*—Don Wong
*Assistant Examiner*—Leith Al-Nazer
(74) *Attorney, Agent, or Firm*—Birch, Stewart, Kolasch & Birch, LLP.

(57) ABSTRACT

Heretofore, if the beam size of the resonance mode is made small in a long resonator length, there arises a problem that the operation of the laser resonator becomes easy to be unstable and hence the adjustment thereof becomes difficult. A laser resonance includes: a laser material; a telescope for magnifying a laser beam which has been made incident from the laser material and for reducing a laser beam which has been made incident from the side opposite thereto; a flat reflecting mirror for reflecting the laser beam which has been made incident from said telescope; a telescope for magnifying the laser beam which has been reflected by the flat reflecting mirror to be reduced by the telescope and to be amplified by the laser material to be made incident thereto; and a flat reflecting mirror for reflecting the laser beam which has been made incident from the telescope. The telescope having suitable magnification is selected for the resonator length, whereby the beam size of the resonance mode at the center of the resonator can be arbitrarily adjusted and the stable resonator which has the small beam size with the long resonator length can be constructed.

18 Claims, 17 Drawing Sheets

US 6,853,670 B2

LASER RESONATOR

This application is a continuation-in-part of Application Ser. No. 09/814,115 filed on Mar. 22, 2001 now abandoned, the entire contents of which are hereby incorporated by reference.

BACKGROUND OF THE INVENTION

1. Field of the Invention

The present invention relates to a laser resonator which is used in, for example, a solid laser device installed in airports or the like, or a solid laser device mounted in trajectory bodies such as artificial satellites or aircrafts, and more particularly which requires a long resonance length for a pulse type coherent lidar (laser rader) for measuring the wind velocity or the like.

2. Description of the Related Art

For a coherent lidar for measuring the wind velocity or the speed of a movable body, in order to transmit the laser beam towards the fields, the wavelength in the range of 1.4 µm to 2.0 µm (the eye safe wavelength) which is safe for human eyes is required.

As for the laser material for oscillating with this eye safe wavelength, for example, there have been well known Er: Glass (the oscillation wavelength is 1.5 µm), Er, Yb: Glass (the oscillation wavelength is 1.5 µm), Er: YAG (the oscillation wavelength is 1.6 µm), Tm: YAG (the oscillation wavelength is 2 µm), Tm, Ho: YAG (the oscillation wavelength is 2 µm), Ho: YLF (the oscillation wavelength is 2 µm), Tm, Ho: YLF (the oscillation wavelength is 2 µm), and the like. In general, however, in each of the laser materials, the gain inherent in the material is small.

In this case, in order to obtain the output with high efficiency, it is required that the cross sectional area in the direction perpendicular to the optical axis of the laser material is reduced to carry out the excitation with high density by an excitation light source to obtain the relatively high gain. In addition, for the coherent lidar, in order to enhance the accuracy of measuring the wind velocity, the long pulse width $t_p$ is required. Moreover, in order to reduce a divergence angle of outputted laser beams, a high beam quality is required.

When a small signal gain of the laser material is $g_0 l$, a circulation loss in the resonator is loss and the light velocity is c, in the standing wave type laser resonator, the efficiency η of taking out the energy, and the pulse width $t_p$ when the output becomes the maximum are expressed as Expression (1) and Expression (2), respectively.

$$\eta = 1 - \left(\frac{1 + \ln z}{z}\right) \quad \text{(Expression 1)}$$
$$z = \frac{2g_0 l}{\text{loss}}$$
$$t_p = \frac{2L}{c \cdot \text{loss}}\left(\frac{\ln z}{z[1 - a(1 - \ln a)]}\right) \quad \text{(Expression 2)}$$
$$a = \frac{(z-1)}{z \ln z}$$

Now, since the condition in which the laser oscillation occurs becomes $2 g_0 l > \text{loss}$, i.e., $z > 1$, the extraction η is increased as $g_0 l$ is further increased. Therefore, in order to obtain the pulse width $t_p$ with the high efficiency, the high small signal gain $g_0 l$ and the long resonator length L are both required.

A loss to a propagation mode in the laser resonator can be described qualitatively using a Fresnel number N represented by a smallest aperture radius "a" in the resonator and a resonator length L. The Fresnel number N is defined by the following expression:

$$N = a^2/\lambda L \quad \text{Expression (A1)}$$

FIG. 23 shows a relationship between the Fresnel number N and a loss given to the propagation mode in the laser resonator, which is described in "Springer Series in Optical Sciences Vol. 1 'Solid-State Laser Engineering Ver. 4' Walter Koechner (1995, Springer, Germany), page 202".

As the Fresnel number decreases, the loss given to the propagation mode increases. A loss generated due to a transmissivity of optical components, or the like of a general laser resonator is in the order of several percent to 10%. In the case in which the Fresnel number N is smaller than 0.7, a loss given to a basic mode (TEM00 mode) that is least affected by a loss increases to the same degree as other losses, whereby fall in an output occurs and it becomes difficult to obtain stable laser oscillation.

On the other hand, since a loss to a higher mode also decreases when the Fresnel number increases, oscillation of a higher mode is generated and it becomes difficult to obtain a laser output of a high beam quality. Thus, it is desirable to set the Fresnel number to the order of three at the maximum. In a laser apparatus used in a coherent lidar, since a cross-section in a direction perpendicular to an optical axis of a laser material is required to be reduced, an aperture radius "a", which gives the Fresnel number N of a resonator, is generally restricted by a radius of the laser material.

The conventional laser resonator will herein below be described with reference to the associated ones of the accompanying drawings. FIG. 18 is a schematic view showing the construction of a conventional laser resonator which, for example, is shown in an article of "Springer Series in Optical Science", by Walter Koechner, Solid-state laser engineering, 4th edition (Springer, Germany, 1995, pp. 197), and an article of "LASERS", by Siegman (University Science Books, U.S.A., 1986), pp. 755.

In FIG. 18, reference numerals 1 and 2 denote concave reflecting mirrors which are arranged at a distance of the resonator L in such a way as to face each other to confine therein a laser beam, reference numeral 3 denotes a laser material, reference numeral 4 denotes an excitation light source for exciting the laser material 3, reference numeral 5 denotes a resonance mode of the Gaussian beam which is defined between the concave reflecting mirrors 1 and 2, reference numeral 6 denotes an aperture for limiting the resonance mode, and reference numeral 7 denotes an optical axis.

Next, the operation of the conventional laser resonator thus described will hereinbelow be described with reference to the associated ones of the accompanying drawings.

In the laser resonator as described above, the laser beam makes a round trip between the concave reflecting mirrors 1 and 2 to pass repeatedly through the laser material 3 which is excited by the pump light source 4 to be optically amplified, thereby forming the resonance modes 5 of the Gaussian beam. The aperture 6 is arranged in order to select only the low-order mode of the resonance mode 5 to generate the laser beam of high quality. As the aperture 6, the aperture of the optical component for the laser material 3 and the mirrors which are arranged within the laser resonator may be employed in some cases.

When the curvature of the concave reflecting mirror 1 is $R_1$, the curvature of the concave reflecting mirror 2 is $R_2$, and the distance between the concave reflecting mirrors 1 and 2 is L, a beam size $\omega_0$ in the position where the beam size ($1/e^2$ radius) of the resonance mode 5 within the laser resonator, a beam size $\omega_1$ of the resonance mode 5 in the concave reflecting mirror 2, and the beam size $\omega_2$ of the resonance mode 5 in the concave reflecting mirror 2 are expressed as the following Expression (3).

$$\omega_0^4 = \left(\frac{\lambda}{\pi}\right)^2 \frac{L(R_1 - L)(R_2 - L)(R_1 + R_2 - L)}{(R_1 + R_2 - 2L)^2} \quad \text{(Expression 3)}$$

$$\omega_1^4 = \left(\frac{\lambda R_1}{\pi}\right)^2 \frac{R_2 - L}{R_1 - L}\left(\frac{L}{R_1 + R_2 - L}\right)$$

$$\omega_2^4 = \left(\frac{\lambda R_2}{\pi}\right)^2 \frac{R_1 - L}{R_2 - L}\left(\frac{L}{R_1 + R_2 - L}\right)$$

Now assuming that for the sake of simplicity, the relationship of $R_1 = R_2 = R_3$ is established, the above Expression (3) is rewritten into the following Expression (4).

$$\omega_0^4 = \left(\frac{\lambda}{\pi}\right)^2 \frac{L(2R - L)}{4} \quad \text{(Expression 4)}$$

$$\omega_1^4 = \omega_2^4 = \left(\frac{\lambda R}{\pi}\right)^2 \left(\frac{L}{2R - L}\right)$$

That is, the beam size $\omega_0$ in the position where the beam size of the resonance mode 5 becomes the smallest is decreased the smaller the resonance length L, and also as smaller the value of $2 \times R - L$. in this connection, when it is assumed that the relationship of $R_1 = R_2 = R_3$ is established, the position of $\omega_0$ where the beam size becomes the smallest, becomes the center of the laser resonator, i.e., the position which is L/2 away from the concave reflecting mirror 1. From Expression (4), in order to obtain the small $\omega_0$, there are required the short resonance length L and the concave reflecting mirror having the curvature R with which the value of $2 \times R - L$ becomes small.

FIG. 19 shows the relationship between the curvature R of the concave reflecting mirror, and $\omega_0$ and $\omega_1$ when the resonance length L is set to 2 m. For example, the curvature R with which the value of $\omega_0$ equal to or smaller than 0.25 mm is obtained is in the range of 1.017 m to 1.000 m, and the value of $\omega_1$ at this time is in the range of 1.92 mm to $\infty$. Therefore, when the beam size is made to be small, the allowable range of the curvature R is narrow and also the beam size $\omega_0$ becomes sensitive to the change in the curvature R and the resonator length L. In addition thereto, the operation of the resonator becomes easily unstable, and hence the adjustment thereof becomes difficult. Also, since when the resonator length L is made longer with the same beam size, the operation of the resonator becomes further unstable, thus it is impossible to make the resonator length L sufficiently long.

In addition, in the case in which a radius in a direction perpendicular to an optical axis of the laser material 3 is assumed to be "a", in order to suppress a higher mode without significantly increasing a loss to a basic mode, in general, a size of the laser material 3 is set such that the aperture size "a" is approximately 1.5 times as large as the beam size $\omega_0$. The Fresnel number N of this conventional laser resonator is 0.047. In this case, from FIG. 23, a large loss to the basic mode is generated and it becomes difficult to obtain stable laser oscillation.

Next, FIG. 20 is a schematic view showing the situation of the resonance beam mode when an inclination δ occurs in he concave reflecting mirror 1. When an inclination occurs in he concave reflecting mirror 1, the misalignment occurs between he optical axis 8 of the resonance mode 5 and the optical axis 7 f the laser resonator. At this time, when the deviation angle of the optical axis in the concave reflecting mirror 1s $d_1$, the deviation angle of the optical axis in the concave reflecting mirror 1 is $δ_1$, the deviation amount of optical axis in the center of the resonator is $d_0$, and the deviation angle of the optical axis in the center of the resonator is $δ_0$, $d_0$, $δ_0$, $d_1$, and $δ_1$ are respectively expressed on the basis of Expression (5).

$$d_0 = \frac{\theta \cdot R}{2} \quad \text{(Expression 5)}$$

$$\theta_0 = \frac{\theta \cdot R}{2R - L}$$

$$d_1 = \frac{\theta \cdot R \cdot (R - L)}{2R - L}$$

$$\theta_1 = \frac{\theta \cdot R}{2R - L}$$

FIG. 21 shows the relationship between the curvature R of the concave reflecting mirror, and the deviation amount $d_0$ with the optical axis in the center of the resonator and the deviation amount $d_1$ with optical axis in the concave reflecting mirror 1 when the resonator length is 2 m and when giving the concave reflecting mirror 1 an inclination of $θ=100$ μrad. In this connection, at the same time, FIG. 21 also shows the relationship between the curvature R of the concave reflecting mirror, and $\omega_0$ and $\omega_1$ shown in FIG. 19. The deviation amount $d_1$ in the position of the concave reflecting mirror 1 is increased as the mode size $θ_0$ is further decreased. For example, when $θ_0=0.25$ mm, $d_1=-2.9$ mm.

FIG. 22 shows the relationship between the curvature R of the concave reflecting mirror and the deviation angle $θ_0$ ($=θ_1$) with the optical axis in the central position of the resonator when the resonator length L is 2 ms and when giving the concave reflecting mirror 1 the inclination of $θ=100$ μrad. The deviation angle $θ_0$ in the central position of the resonator is increased as the curvature R of the concave reflecting mirror 1 approaches 1. For example, when $\omega_0=0.25$ mm, $\omega_0=3.0$ mrad is obtained. This means that the inclination occurs which is 30 times as large as the inclination angle $θ=100$ μrad of the mirror.

Since when the resonance mode in the position of the concave reflecting mirror 1 is deviated, the eclipse of the apertures of the optical components arranged in the aperture 6 and on the optical axis occurs, the laser output is decreased and also the quality of the laser beam is degraded. For example, when $\omega_0=0.25$ mm, the beam size $\omega_1$ in the position of the concave reflecting mirror 1 is 1.92 mm. Thus, when the above-mentioned deviation $θ=100$ μrad occurs, the resonance mode 5 is perfectly refused by the aperture 6, therefore the resonance mode cannot be formed and the laser output cannot be obtained. In addition, the slight inclination of the concave reflecting mirror gives the optical axis of the resonance mode within the resonator a large inclination so that the stability in the emission direction of the outputted laser beam is reduced.

In addition, in order to make the polarization of the laser beam linear, e.g., in the case when the emitted laser beam is used in the wavelength conversion, a polarizer needs to be arranged on the optical path. When the polarizer is arranged on the optical path of the laser beam, the degradation of the extinction ratio of the polarizer occurs depending on the incident angle of the laser beam. For this reason, when the angular deviation of the laser beam is large, a part of the laser beam is outputted to the outside by the polarizer so that the efficiency of utilizing the laser beam is reduced.

Furthermore, when a birefringent material such as an EO-Q switch is arranged on the optical path of the laser beam, the birefringent material changes the polarization of the laser beam depending on the incident angle of the laser beam. Therefore, the resonance cannot be carried out as the laser beam so that the efficiency of utilizing the laser beam is reduced.

In the conventional laser resonator as described above, if the beam size $\omega_0$ of the resonance mode is made small in the long resonator length, then the change in the resonator mode 5 is increased with respect to the change in the curvature R of the concave reflecting mirror and the resonator length L. Therefore, there arises the problem that the operation of the laser resonator becomes easily unstable and hence the adjustment thereof becomes difficult.

In addition if the resonator length L is wanted to be made long with the same beam size, the operation of the laser resonator becomes further unstable. Therefore, there arises the problem that the resonator length L cannot be made sufficiently long.

In addition, since the Fresnel number N of the resonator decreases, there arises a problem that a loss given to the basic mode is large and stable laser oscillation cannot be obtained.

Furthermore, when the inclination occurs in the concave reflecting mirror 1, the eclipse due to the aperture 6 and the aperture(s) of the optical component(s) arranged on the optical axis occurs. Therefore, there arises the problem that the laser output is reduced, the efficiency of utilizing the laser beam is reduced and the quality of the laser beam is degraded.

In addition, since the slight inclination of the concave reflecting mirror 1 gives the resonance mode within the resonator the large inclination, there arises the problem that the stability in the emission direction of the outputted laser beam is reduced.

Further, when the polarizer is arrange on the optical path of the laser beam, the extinction ratio of the polarizer is degraded depending on the incident angle of the laser beam. Therefore, there arises the problem that a part of the laser beam is outputted to the outside by the polarizer and hence the efficiency of utilizing the laser beam is reduced.

Furthermore, when the birefringent material such as the EO-Q switch is arranged on the optical path of the laser beam, the birefringent material changes the polarization of the laser beam depending on the incident angle of the laser beam. Therefore, there arises the problem that the resonance cannot be carried out as the laser beam and hence the efficiency of utilizing the laser beam is reduced.

SUMMARY OF THE INVENTION

In the light of the foregoing, the present invention has been made in order to solve the problems associated with the prior art, and it is therefore an object of the present invention to provide a laser resonator in which a small beam size can be stably obtained in a long resonator length, the reduction of the efficiency of utilizing a laser beam and the quality of the laser beam can be prevented, and the emission direction of the laser beam can be stabilized.

A laser resonator according to a first aspect of the present invention comprises: a laser material for being excited by a light source to amplify optically a laser beam; a first telescope for magnifying the laser beam which has been incident from the laser material and for reducing the laser beam which has been made incident from the opposite side to the side of the laser material; first reflecting means for reflecting the laser beam, which has been made incident from the first telescope in the direction opposite to the incident direction; a second telescope which is arranged in such a way as to face the first telescope with the laser material sandwiched between the first telescope and the second telescope and which serves to magnify the laser beam which has been reflected by the first reflected means to be reduced by the first telescope and to be amplified by the laser material to be made incident thereto and also serves to reduce the laser beam which has been made incident from the opposite side to the side of the laser material; and second reflecting means which is arranged in such a way as to face the first reflecting means with the laser material sandwiched between the first reflecting means and the second reflecting means and which serves to reflect the laser beam, which has been made incident from the second telescope, in the opposite direction to the incident direction, wherein magnifications of said first and second telescopes are set such that a loss to a lower mode decreases and a loss to a higher mode increases in the resonator.

A laser resonator according to a second aspect of the present invention comprises: a laser material for being excited by a light source to amplify optically a laser beam; a telescope for magnifying the laser beam which has been made incident from the laser material and for reducing the laser beam which has been made incident from the opposite side to the side of the laser material; first reflecting means for reflecting the laser beam, which has been made incident from the first telescope in the direction opposite to the incident direction; second reflecting means which is arranged in such a way as to face the first reflecting means with the laser material sandwiched between the first reflecting means and the second reflecting means and which serves to reflect the laser beam, which has been reflected by the first reflecting means to be reduced by the telescope and to be amplified by the laser material to be made incident thereto, in the opposite direction to the incident direction, wherein a magnification of said telescope is set such that a loss to a lower mode decreases and a loss to a higher mode increases in the resonator.

A laser resonator according to a third aspect of the present invention comprises: a laser material for being excited by a light source to amplify optically a laser beam; a first telescope for magnifying the laser beam which has been made incident from the laser material and for reducing the laser beam which has been made incident from the opposite side to the side of the laser material; a second telescope for magnifying the laser beam which has been made incident from the first telescope and for reducing the laser beam which has been made incident from the opposite side to the side of the first telescope; first reflecting means for reflecting the laser beam, which has been made incident from the second telescope, in the opposite direction to the incident direction; a third telescope which is arranged in such a way as to face the first telescope with the laser material sandwiched between the first telescope and the second telescope and which serves to magnify the laser beam which has been reflected by the first reflecting means to be reduced by the first and second telescopes and to be amplified by the laser material to be made incident thereto and also serves to reduce the laser beam which has been made incident from the opposite side to the side of the laser material; a fourth telescope which is arranged in such a way as to face the second telescope with the laser material sandwiched between the second telescope and the fourth telescope and which serves to magnify the laser beam which has been made incident from the third telescope and to serve to reduce the laser beam which has been made incident from the opposite side to the side of the third telescope; and second reflecting means which is arranged in such a way as to face the first reflecting means with the laser material sandwiched between the first reflecting means and the second reflecting means and which serves to reflect the laser beam, which has been made incident from the fourth telescope, in the opposite direction to the incident direction, wherein magnifications of said first, second, third and fourth telescopes are set such that a loss to a lower mode decreases and a loss to a higher mode increases in the resonator.

BRIEF DESCRIPTION OF THE DRAWINGS

The above and other objects as well as advantages of the present invention will become clear by the following description of the preferred embodiments of the present invention with reference to the accompanying drawings.

DESCRIPTION OF THE PREFERRED EMBODIMENTS

The preferred embodiments of the present invention will herein after be described in detail with reference to the accompanying drawings.

Embodiment 1

Figure 1:
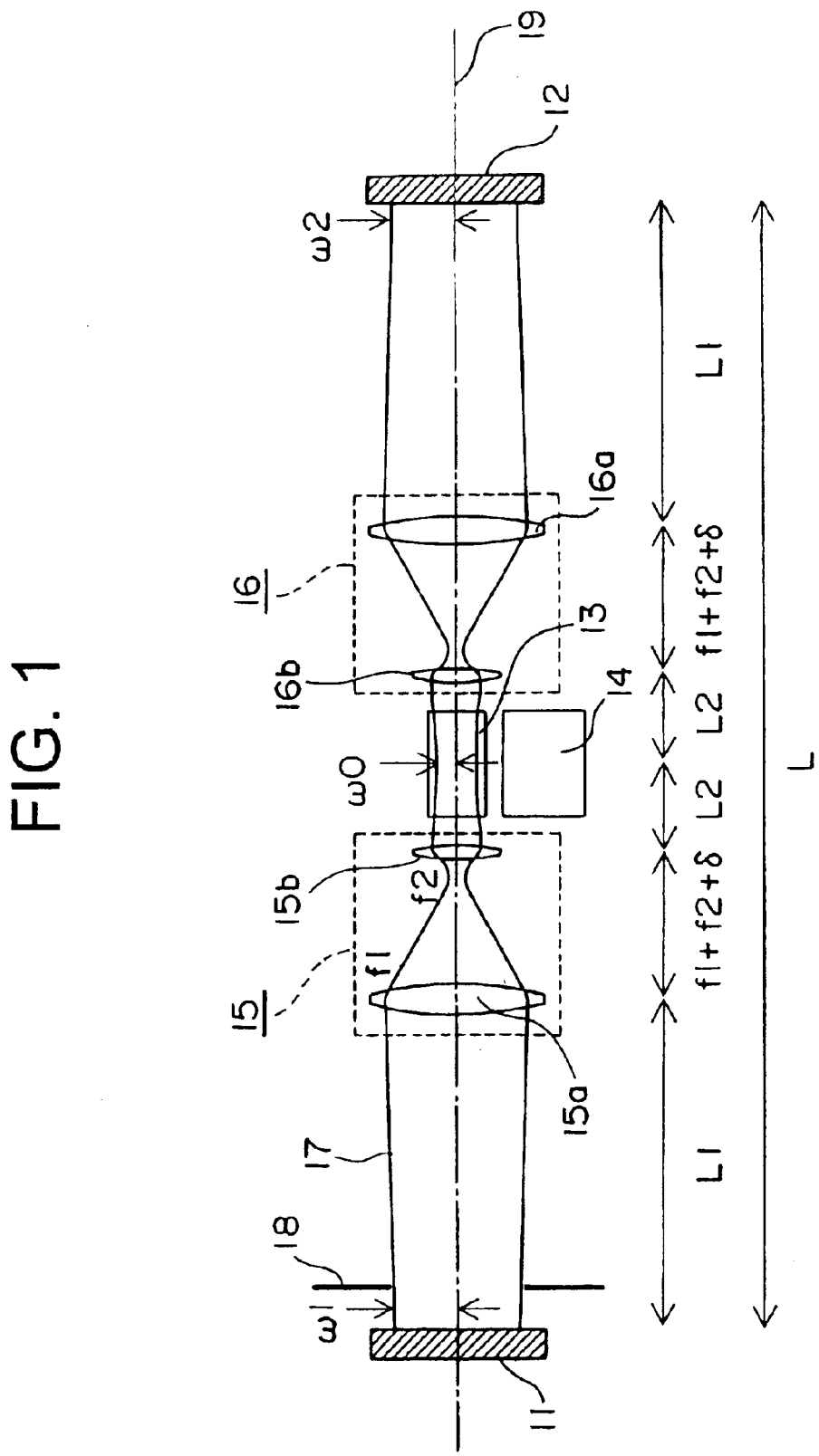
FIG. 1 is a schematic view showing the construction of a laser resonator according to a first embodiment of the present invention.

A laser resonator according to Embodiment 1 of the present invention will herein below be described in detail with reference to associated ones of the accompanying drawings. FIG. 1 is a schematic view showing the construction of a laser resonator according to Embodiment 1 of the present invention. In this connection, in the figures, the same or corresponding parts are denoted with the same reference numerals.

In FIG. 1, reference numerals 11 and 12 denote plane reflecting mirrors, respectively; reference numeral 13 denotes a laser material; reference numeral 14 denotes a pump light source for exciting the laser material 13; reference numeral 15 denotes a telescope having lenses 15a and 15b; reference numeral 16 denotes a telescope having lenses 16a and 16b; reference numeral 17 denotes a resonance mode within a laser resonator; and reference numeral 18 denotes an aperture for limiting the resonance mode 17.

The plane reflecting mirrors 11 and 12 are arranged in a symmetrical style with the laser material 13 as the center. In addition, the telescope 15 is arranged between the plane reflecting mirror 11 and the laser material 13. Then, it is assumed that a focal length of the lens 15a of the telescope 15 is $f_1$, a focal length of the lens 15b of the telescope 15 is $f_2$, and an interval between the lends 15a and the lends 15b is $f_1+f_2+\delta$. Also, it is assumed that the relationship of $|f_1/f_2|>1$ is established. The same optical component is employed for the telescope 15 and the telescope 16 which are in turn arranged symmetrically with the laser material 13 as the center. The lens 15a and the plane reflecting mirror 1, and the lens 16a and the plane reflecting mirror 12 are arranged in such a way that a distance between the lens 15a and the plane reflecting mirror 1 and a distance between the lens 16a and the plane reflecting mirror 12 becomes each $L_1$.

Next, the description will hereinbelow be given with respect to the operation of the laser resonator according to Embodiment 1 with reference to FIGS. 1 to 8.

The laser beam which has been emitted in the direction towards the telescope 15 through the laser material 13 is magnified by the telescope 15 to be propagated to be reflected in the opposite direction to the incident laser beam by the plane reflecting mirror 11. Then, the laser beam which has been reflected by the plane reflecting mirror 11 is reduced by the telescope 15 to be made incident to the laser material 13 again. Further, after the laser beam which has been made incident to the laser material 13 passes through the laser material 13 to be optically amplified, it is magnified by the telescope 16 to be propagated to be reflected in the opposite direction to the incident laser beam by the plane reflecting mirror 12. The laser beam which has been reflected by the plane reflecting mirror 12 is reduced by the telescope 16 to be made incident to the laser material 13 again. Then, the laser beam is further optically amplified by the laser material 13. That is, the laser beam which has been emitted from the laser material 13 makes a round through the same optical path to be returned back to the laser material 13 to thereby be confined in the laser resonator.

Next, let us consider the magnitude of the resonance mode 17 in the resonator. Assuming that the relationship of $L'=L_1-f_1=L_0/2$, $f_1/f_2=M$, and $f_1^2/\delta=R_0$ are established, the beam size $\omega_0$ in the central position of the resonator and the beam size $\omega_1$ in the plane reflecting mirror 11 are expressed by the following Expression (6). Note that, for the sake of simplicity of Expression, $L2=f_2$ is assumed.

$$\omega_0^4 = \left(\lambda \frac{f_1^2}{\delta}\right)^2 \left(\frac{2L'}{2\frac{f_1^2}{\delta}-2L'}\right)\left(\frac{f_2}{f_1}\right)^4 = \frac{1}{M^4}\left(\frac{\lambda \cdot R_0}{\pi}\right)^2 \left(\frac{L_0}{2R_0-L_0}\right) \quad \text{(Expression 6)}$$

$$\omega_1^4 = \omega_2^4 = \left(\frac{\lambda}{\pi}\right)^2 \frac{2L'\left(2\frac{f_1^2}{\delta}-2L'\right)}{4} = \left(\frac{\lambda}{\pi}\right)^2 \frac{L_0(2R_0-L_0)}{4}$$

From the above Expression (6), it is understood that for an arbitrary $L_0$, the suitable telescope fulfilling the relationship of $f_1/f_2=M$ is employed, whereby an arbitrary beam size $\omega_0$ is obtained.

Figure 2:
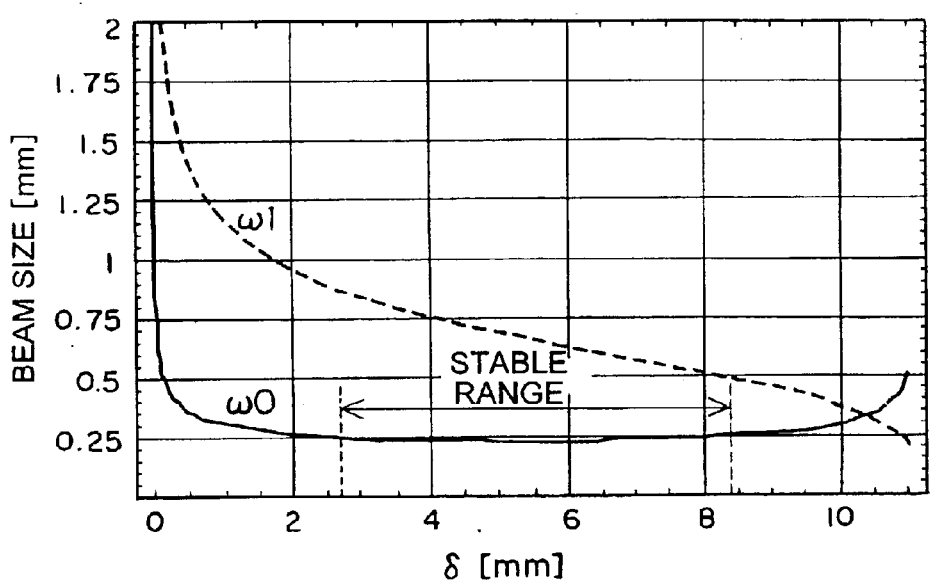
FIG. 2 is a graphical representation explaining the beam size of the laser resonator according to the first embodiment of the present invention.

FIG. 2 a graphical representation explaining the relationship between a lens interval difference $\delta$ (=the lens interval of the telescope-$f_1-f_2$), and $\omega_0$ and $\omega_1$ when $L_1=1$ m, $f_0=0.1$ m, and $f_2=0.025$ m, and $L_2=0.025$ m. For example, the lens interval difference $\delta$ in which $\omega_0$ is equal to or smaller than 0.25 mm is obtained is in the range of 2.7 mm to 8.4 mm, and hence it is understood that the stable beam size is obtained over a wide range. In addition, $\omega_1$ at this time is in the range of 0.87 mm to 0.49 mm.

In addition, in the case in which the telescopes are arranged on both sides of the laser material as described above, the aperture radius "a", which gives the Fresnel number N of the resonator, is magnified M times by the telescopes 15 and 16 and an effective Fresnel number M is given by the following expression:

$$Nf=(Ma)^2/\lambda L \quad \text{Expression (A2)}$$

In order to suppress a higher mode without significantly increasing a loss to the basic mode, in general, it is sufficient to set a size of the laser material 3 such that the aperture size "a" is approximately 1.5 times as large as the beam size $\omega_0$.

Figure 23:
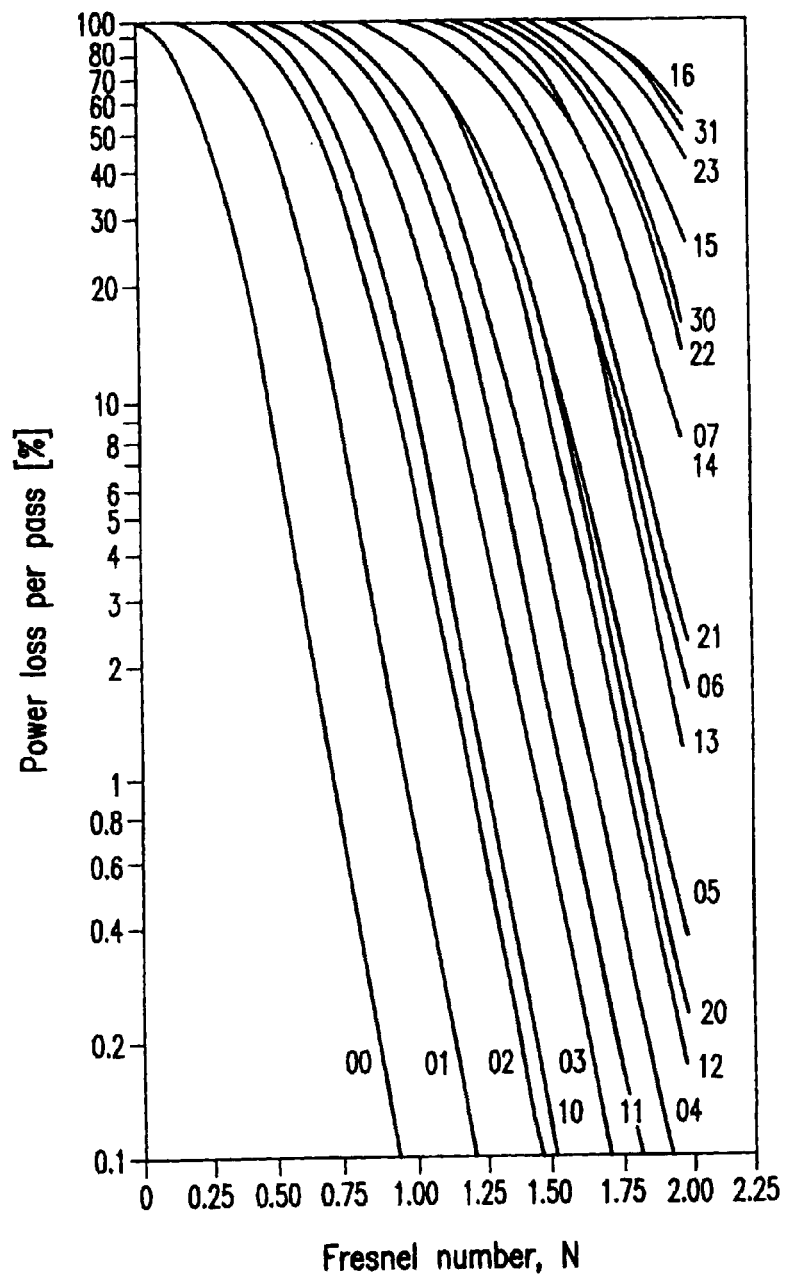
FIG. 23 is a graph showing a relationship between the Fresnel number N and a loss given to the propagation mode in the laser resonator, which is described in "Springer Series in Optical Sciences Vol. 1 'Solid-State Laser Engineering Ver. 4' Walter Koechner (1995, Springer, Germany), page 202".

In this case, since the effective Fresnel number Nf of this resonator is 0.75 and the Fresnel number exceeds 0.7, from FIG. 23, a loss to the basic mode decreases and it becomes possible to obtain stable laser oscillation. In addition, a loss to the higher mode is large and it is possible to suppress oscillation of the higher mode to obtain a laser output of a high beam quality.

Figure 3:
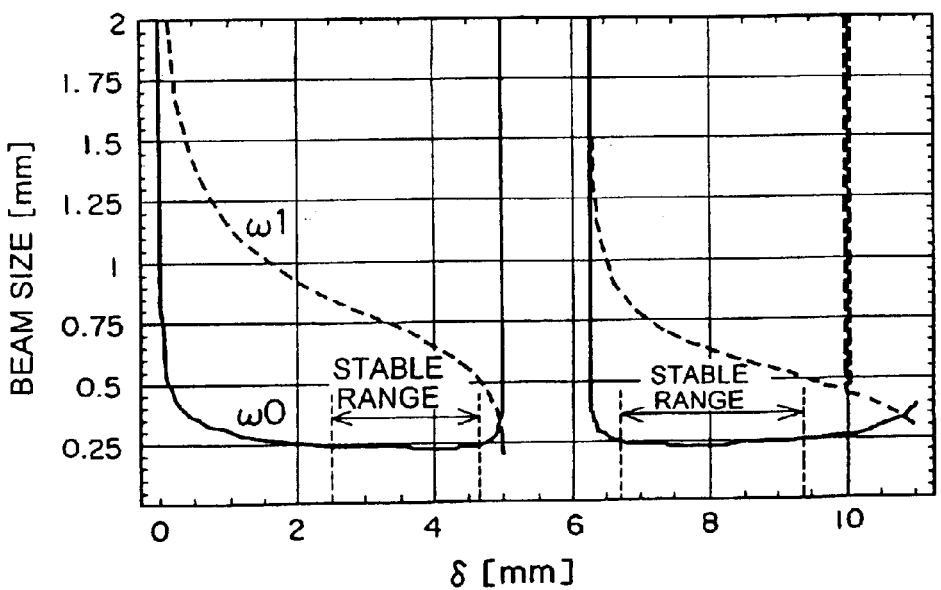
FIG. 3 is a graphical representation explaining the beam size when the laser resonator according to the first embodiment of the present invention is not symmetrical with the resonator as the center.

Next, let us consider the case where the construction of the laser resonator is deviated from the symmetry. FIG. 3 shows the relationship between the lens interval difference $\delta$ (=the lens interval of the telescope-$f_1f_2$), and $\omega_0$ and $\omega_1$ when the distance between the plane reflecting mirror 11 and the lens 15a is 1.1 m, and the distance between the plane reflecting mirror 12 and the lens 16a is 0.9 m. From FIG. 3, it is understood that the stable range is roughly divided into two ranges and also the extent of the stable region becomes narrow. The two regions become away from each other and hence the stable region becomes narrow as the construction of the laser resonator is further deviated from the symmetry. Therefore, the constituent elements of the resonator are arranged roughly in a symmetrical style, whereby the wide stable region can be obtained.

Figure 4:
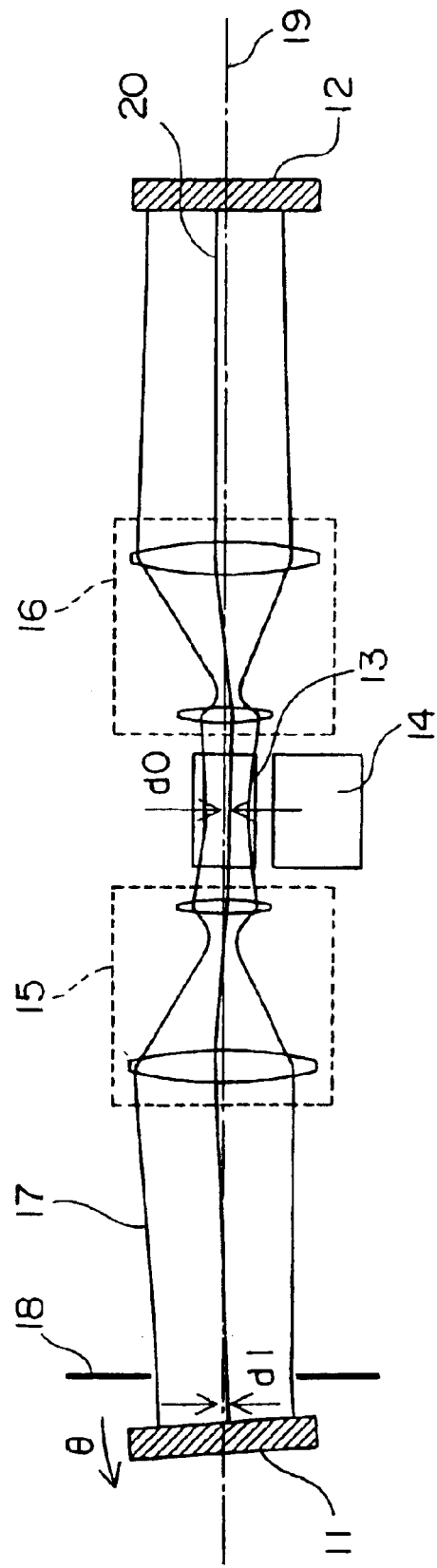
FIG. 4 is a schematic view showing the resonance mode when plane reflecting mirror of the laser resonator according to the first embodiment of the present invention is inclined.

Next, FIG. 4 is a schematic view showing the situation of the resonance beam mode when an inclination $\theta$ occurs in the plane reflecting mirror 11, the misalignment occurs between the optical axis 20 of the resonance mode and the optical axis 19 of the laser resonator. At this time, assuming that the deviation amount of the optical axis in the plane reflecting mirror is $d_1$, the deviation angle of the optical axis in the plane reflecting mirror 11 is $\theta_1$ the deviation amount of the optical axis in the resonator center is $d_0$, and the deviation angle of optical axis in the resonator center is $\theta_1$, $d_0$, $\theta_1$, $d_1$, and $\theta_1$ are respectively expressed by the following Expression (7).

$$d_0 = -\frac{\theta \cdot f_1 \cdot f_2}{2 \cdot \delta} = -\frac{\theta \cdot R_0}{2M} \quad \text{(Expression 7)}$$

$$\theta_0 = -\frac{M \cdot \theta}{2}$$

$$d_1 = \frac{\theta \cdot (f_1^2 - 2 \cdot \delta \cdot L')}{2 \cdot \delta} = \frac{\theta \cdot (R_0 - L_0)}{2}$$

$$\theta_1 = \theta$$

Figure 5:
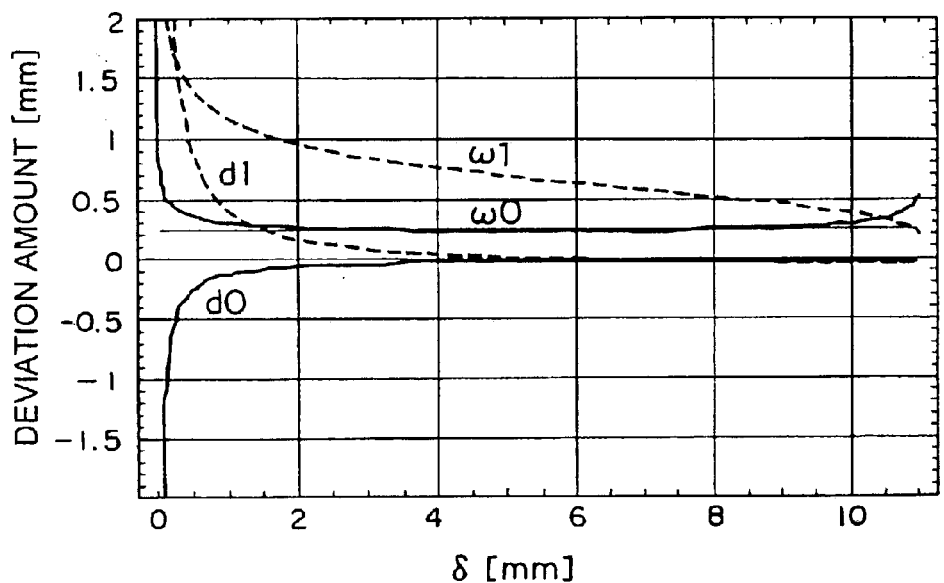
FIG. 5 is a graphical representation explaining the misalignment amount between an optical axis of the laser resonator shown in FIG. 4 and the axis of the resonance mode.

FIG. 5 is a graphical representation showing the relationship between the lens interval difference $\delta$ (=the lens interval of the telescope-$f_1-f_2$), and the deviation amount do with the optical axis in the resonator center and the deviation amount $d_1$ with the optical axis in the plane reflecting mirror 11 when giving the plane reflecting mirror 11 an inclination $\theta=100$ μrad when $L_0=2$ m, $f_1=0.1$ m, $f_2=0.025$ m and $L_2=0.025$ mm. Note that, FIG. 5 also shows the relationship between the lens interval difference $\delta$, and $\omega_0$ and $\omega_1$ shown in FIG. 2.

With respect to the deviation amount $d_1$ in the position of the plane reflecting mirror 11, under the condition of the lens interval difference in which $\omega_0$ equal to or smaller than 0.25 mm is obtained, when $\delta=2.7$ mm, $d_1$ is 0.09 mm, when $\delta=8.4$ mm, $d_1$ is $-0.03$ mm, and when $\delta=5.6$ mm, $d_1$ is 0.0 mm. For the value of $\omega_1$ at this time, when $\delta=2.7$ mm, $\omega_1$ is 0.87 mm, and when $\delta=8.4$ mm, $\omega_1$ is 0.49 mm. Thus each of the values of $d_1$ is smaller than that of $\omega_1$, and hence the influence by the eclipse of the aperture 18 is insignificant. Therefore, the stable resonator can be obtained in which the reduction of the laser output due to the inclination of the plane reflecting mirror 11 is hardly generated and also the reduction of the laser beam quality due to the eclipse is hardly generated.

Figure 6:
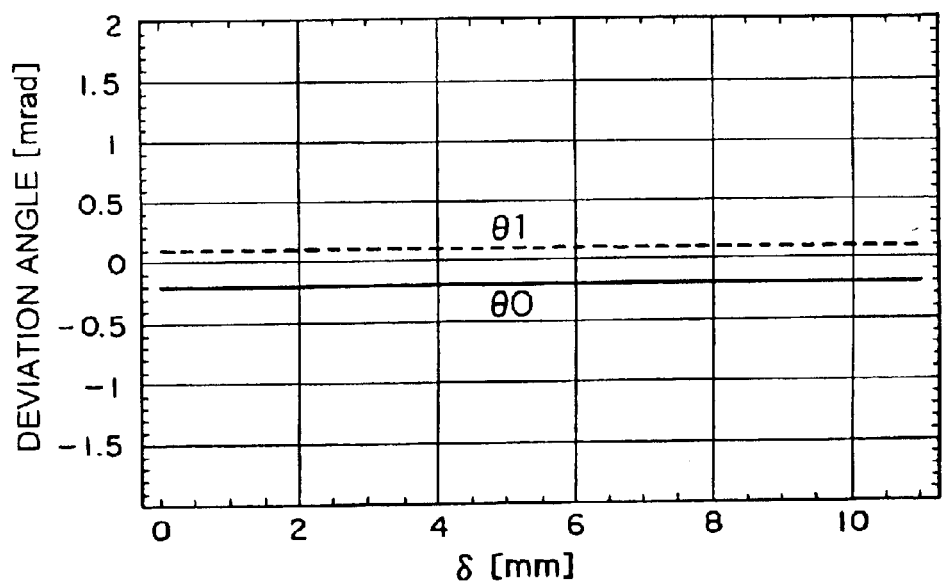
FIG. 6 is a graphical representation explaining the misalignment angle between the optical axis of the laser resonator of FIG. 4 and the axis of the resonance mode.

FIG. 6 shows the relationship between the lens interval difference $\delta$ (=the lens interval of the telescope-$f_1$-$f_2$), and the deviation angle $\theta_0$ with the optical axis in the central position of the resonator and the deviation angle $\theta_1$ with the optical axis in the plane reflecting mirror 11 when giving the plane reflecting mirror 11 an inclination $\theta$=100 μrad when $L_0$=2 m, $f_1$=0.1 m, $f_2$=0.025 m and $L_2$=0.025 mm. As apparent from the figure, $\theta_0$ and $\theta_1$ are both constant independent of the values of $\delta$, and hence $\theta_0$ is 200 μrad and $\theta_1$ is 100 μrad.

Figure 7:
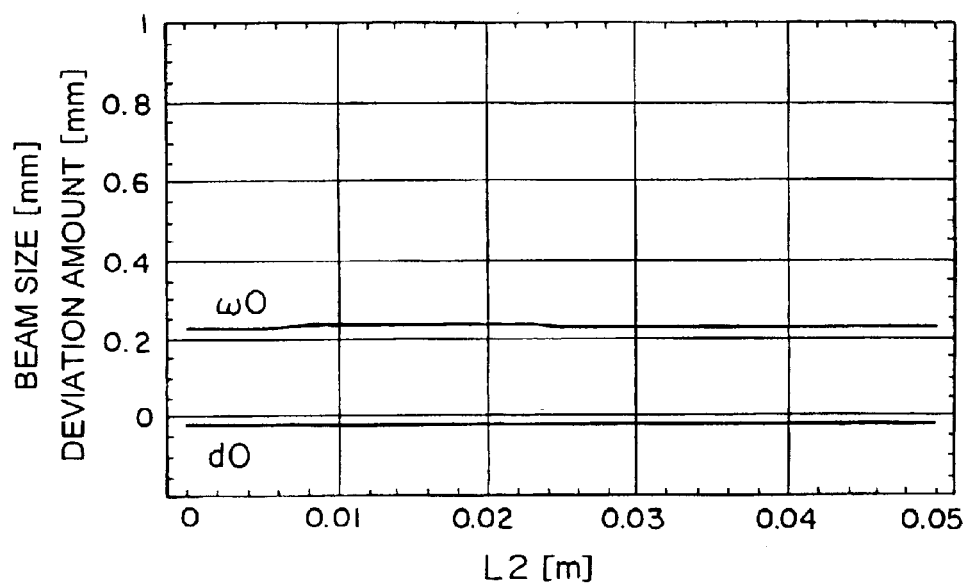
FIG. 7 is a graphical representation explaining the misalignment amount between the beam size and the optical axis when changing a distance between a telescope of the laser resonator of FIG. 4 and a center of the resonator.
Figure 8:
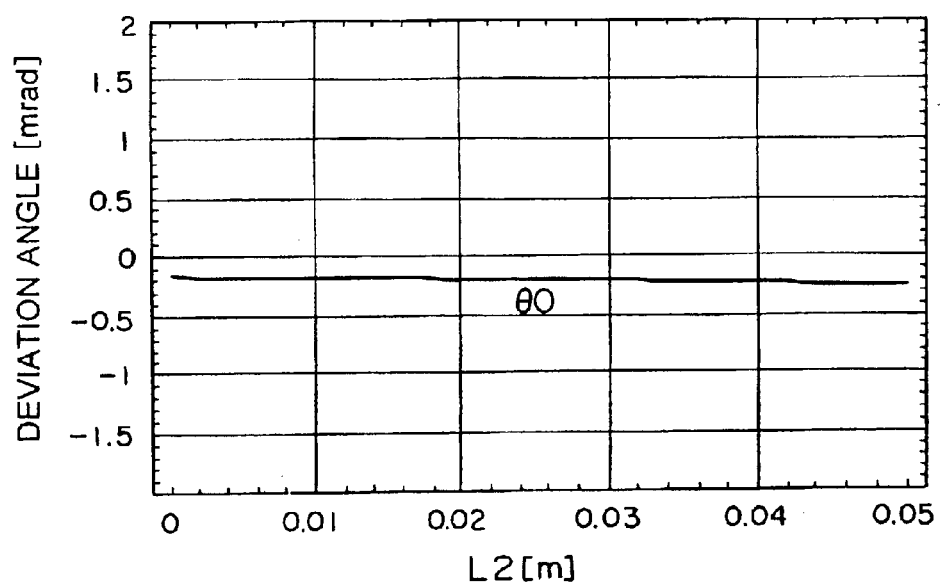
FIG. 8 is a graphical representation explaining the deviation angle of the optical axis when changing the distance between the telescope of the laser resonator of FIG. 4 and the center of the resonator.

In addition, FIG. 7 shows the beam size $\omega_0$ in the resonator center and the deviation amount do with the optical axis in the resonator center when $L_0$=2 m, $f_1$=0.1 m, $f_2$=0.025 m, $\delta$=6 mm, and $\theta$=100 μrad, and $L_2$ is changed from 0 to 0.05 m and FIG. 8 shows the deviation angle $\theta_0$ with the optical axis in the central position of the resonator. As apparent from these figures, all of $\omega_0$, $d_0$ and $\theta_0$ are not largely changed in the range of $L_1$ from 0 to 0.05 m. Thus, the resonator can be constructed in which even when $L_2 \neq f_2$, the influence by the inclination of the plane reflecting mirror is insignificant.

Since in the laser resonator having such construction, the telescope having a suitable magnification M can be selected for the resonator length, a stable resonator which ahs a small beam size in spite of the long resonator length can be constructed.

In addition, since the effective Fresnel number increases, loss to the basic mode decreases and stable laser oscillation can be obtained. Further, since a loss to the higher mode is large and oscillation of the higher mode can be suppressed, a laser output of a high beam quality can be obtained.

In addition, since the influence of the inclination of the plane reflecting mirror constituting the resonator is insignificant, a stable resonator can be constructed in which the reduction of the laser output due to the alignment deviation is prevented and also the reduction of the laser beam quality due to the diffraction of the eclipse is prevented.

In addition, since a small laser material can be used in correspondence to a small beam size, in a laser employing a laser material having a small gain inherent in a material, e.g., the laser material, which oscillates with the eye-safe wavelength, such as Er: Glass (the oscillation wavelength is 1.5 μm), Er, Yb: Glass (the oscillation wavelength is 1.5 μm), Er: YAG (the oscillation wavelength is 1.6 μm), Tm: YAG (the oscillation wavelength is 2 μm), Tm, Ho: YAG (the oscillation wavelength is 2 μm), Ho: YLF (the oscillation wavelength is 2 μm), or Tm, Ho: YLF (the oscillation wavelength is 2 μm), the efficiency of utilizing the laser beam can be enhanced.

In addition, a polarizer for defining the polarization direction of the laser beam may be arranged either between the plane reflecting mirror 11 and the telescope 15, or between the plane reflecting mirror 12 and the telescope 16. By adopting this construction, even when the angular deviation occurs in the plane reflecting mirror 11, the angular deviation is reduced which is exerted on the resonance beam mode in the position of the polarizer. Thus, a laser resonator can be constructed in which the output reduction due to the degradation of the extinction ratio is less and also the efficiency of utilizing the laser beam is high.

Futhermore, a birefringent material, such as an EO-Q switch, for carrying out the pulse driving may be arranged either between the plane reflecting mirror 11 and the telescope 15 or between the plane reflecting mirror 12 and the telescope 16. By adopting this construction, even when the angular deviation occurs in the plane reflecting mirror 11, the angular deviation is reduced which is exerted on the resonance beam mode in the position of the birefringent material. Thus, a laser resonator can be constructed in which the degradation of the extinction ratio of the laser beam becomes less and also the efficiency of utilizing the laser beam is high.

Figure 9:
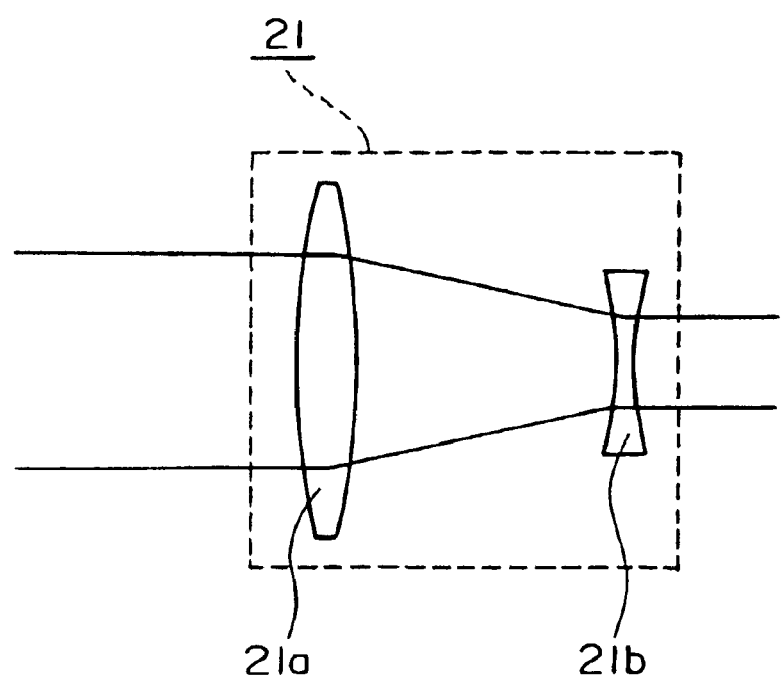
FIG. 9 is a schematic view showing one example of a telescope of the laser resonator according to the first embodiment of the present invention.

While in Embodiment 1, the description has been given with respect to the specific case where the telescopes 15 and 16 both have the positive focal points $f_1$ and $f_2$, respectively, as shown in FIG. 9 a telescope having the negative focal points $f_2$ may be employed. By adopting this construction, since the laser beam is not condensed between a lens 21a and a lens 21b of the telescope 21, and the possibility that the discharge (the air breakdown) due to the high power density occurs is reduced, the reliability of the laser oscillator is enhanced.

Embodiment 2

Figure 10:
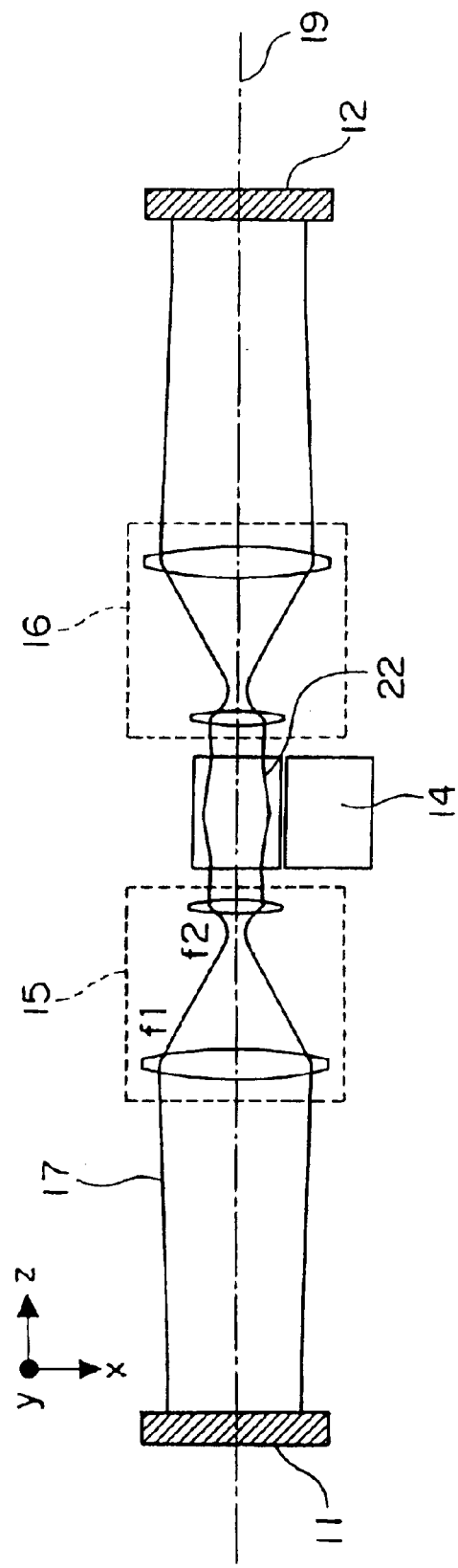
FIG. 10 is a schematic view showing the construction of a laser resonator according to a second embodiment of the present invention.

The description will hereinbelow be given with respect to a laser resonator according to Embodiment 2 of the present invention with reference to FIG. 10. FIG. 10 is a schematic view showing the construction of a laser resonator according to Embodiment 2 of the present invention.

In FIG. 10, reference numeral 22 denoted a laser material which has a focal length $f_r$ and has the thermal lens effect. Other constituent elements are the same as those in the above-mentioned Embodiment 1. Then, assuming that the relationships of L'=L1-$f_1$=$L_0$/2, $f_1$/$f_2$=M and $f_1^2/(\delta+f_2^2/2f_r)$=$R_0$' are established, the beam size $\omega_0$ in the ventral position of the resonator and the beam size $\omega_1$ in the plane reflecting mirror are respectively expressed on the following Expression (8). In this connection, for the sake of simplicity of Expression (8), L2=$f_2$ is assumed.

$$\omega_0^4 = \left(\frac{\lambda\left(f_1^2/\left(\delta+\frac{f_2^2}{2f_r}\right)\right)}{\pi}\right)^2 \left(\frac{2L'}{2\left(f_1^2/\left(\delta+\frac{f_2^2}{2f_r}\right)\right)-2L'}\right)\left(\frac{f_2}{f_1}\right)^4 =$$

$$\frac{1}{M^4}\left(\frac{\lambda \cdot R'_0}{\pi}\right)^2\left(\frac{L_0}{2R'_0-L_0}\right)$$

$$\omega_1^4 = \omega_2^4 = \left(\frac{\lambda}{\pi}\right)^2 \frac{2L'\left(2\left(f_1^2/\left(\delta+\frac{f_2^2}{2f_r}\right)\right)-2L'\right)}{4} =$$

$$\left(\frac{\lambda}{\pi}\right)\frac{L_0(2R'_0-L_0)}{4}$$

(Expression 8)

Comparing with Expression (6), Expression (8) is in the form in which $\delta$ in Expression (6) is replaced with ($\delta$+$f_2^2$/2$f_r$). That is, if the laser material 22 is inserted in the resonator, a resonator can be configured which has a beam size $\omega_0$ that is identical with a beam size before the laser material 22 is inserted in the resonator by changing $\delta$ such that $\delta$ of the resonator before the insertion and ($\delta$+$f_2^2$/2$f_r$) after the insertion is the same. In addition, changes in a beam size and an optical axis of a beam due to an inclination of the plane reflecting mirror 11 will be the same before and after the insertion.

Therefore, in a laser resonator with such a configuration, even in the case in which a laser material having a thermal lens effect is used, since a telescope with an appropriate magnification M to a length of the resonator can be selected, a stable resonator having a small beam size with a large length can be configured. In addition, since an influence of an inclination of a plane reflecting mirror configuring the resonator is small, a stable resonator can be configured in which decrease of a laser output due to misalignment is prevented and degradation of a laser beam quality due to diffraction of an eclipse is also prevented.

Here, a case in which focal lengths of thermal lens of the laser material 22 are different in the x axis direction and the y axis direction is considered. Since a beam size on the laser material 22 in a resonating mode changes according to a focal length of a laser material, if a focal length is different in the x axis direction and the y axis direction, a beam size on the laser material is different in general. At this point, since an overlap of the resonating mode and the laser material 22 worsens, an efficiency of taking out energy from the laser material 22 declines and a utilization efficiency of a laser beam declines.

When the focal length in the x axis direction is $f_{rx}$ and the focal length in the y axis direction is $f_{ry}$, a beam size $\omega_{0x}$ in the x axis direction and a beam size $\omega_{0y}$ in the y axis direction of the resonating mode at a center of the resonator is represented by Expression (9) shown below. Here, $f^1_2/(\delta+f_2^2/2f_{rx})=R_{0x}'$, $f^1_2/(\delta+f_2^2/2f_{ry})=R_{0y}'$.

$$\omega_{0x}^4 = \left(\frac{\lambda\left(f_1^2/\left(\delta+\frac{f_2^2}{2f_{rx}}\right)\right)}{\pi}\right)^2 \left(\frac{2L'}{2\left(f_1^2/\left(\delta+\frac{f_2^2}{2f_{rx}}\right)\right)-2L'}\right)$$ (Expression 9)

$$\left(\frac{f_2}{f_1}\right)^4 = \frac{1}{M^4}\left(\frac{\lambda \cdot R_{0x}'}{\pi}\right)^2 \left(\frac{L_0}{2R_{0x}'-L_0}\right)$$

$$\omega_{0y}^4 = \left(\frac{\lambda\left(f_1^2/\left(\delta+\frac{f_2^2}{2f_{ry}}\right)\right)}{\pi}\right)^2 \left(\frac{2L'}{2\left(f_1^2/\left(\delta+\frac{f_2^2}{2f_{ry}}\right)\right)-2L'}\right)$$

$$\left(\frac{f_2}{f_1}\right)^4 = \frac{1}{M^4}\left(\frac{\lambda \cdot R_{0y}'}{\pi}\right)^2 \left(\frac{L_0}{2R_{0y}'-L_0}\right)$$

Here, $\delta$ is set as shown in Expression (10) below.

$$\delta = \frac{f_1^2}{L_0} - \frac{f_2^2}{4}\left(\frac{1}{f_{rx}}+\frac{1}{f_{ry}}\right)$$ (Expression 10)

At this point, $\omega_{0x}$ and $\omega_{0y}$ are equal.

Therefore, in a laser resonator with such a configuration, even if the laser material 22 has different focal lengths of thermal lens in the x axis direction and the y axis direction, since a beam size in the x axis direction and a beam size in the y axis direction on the laser material coincide, an overlap of a resonating mode and the laser material becomes better and a utilization efficiency of a laser beam improves.

Embodiment 3

Figure 11:
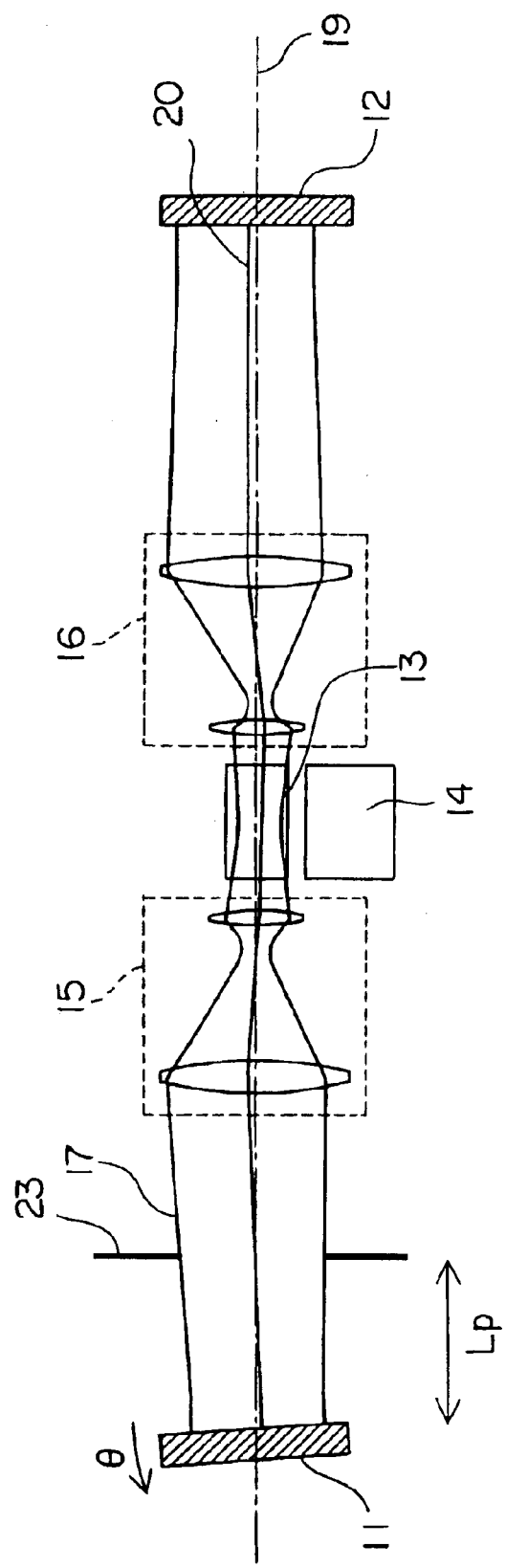
FIG. 11 is a schematic view showing the construction of a laser resonator according to a third embodiment of the present invention.

The description will herein below be given with respect to a laser resonator in accordance with Embodiment 3 of the present invention with reference to drawings. FIG. 11 is a schematic view showing a configuration of a laser resonator in accordance with Embodiment 3 of the present invention.

In FIG. 11, reference numeral 23 denotes an aperture disposed in a position which is apart from a plane reflecting mirror 11 by a distance $L_p$, and the figure illustrates a state of a resonating beam mode when an inclination θ occurs in the plane reflecting mirror 11. Other configurations are the same as those in Embodiment 1.

At this point, a deviation amount $d_p$ of an optical axis and a deviation angle $\theta_p$ of the optical axis in a position of the aperture 23 are represented by Expression (11) shown below.

$$d_p = \frac{\theta \cdot (f_1^2 - 2 \cdot \delta \cdot (L' - L_p))}{2 \cdot \delta}$$ (Expression 11)

$$\theta_p = \theta$$

Here, if $L_p=L'-f_1^2/2\delta=L_1-f_1-f_1\times f_1/(2/\delta)$, $d_p$ is always 0 regardless of the inclination θ of the plane reflecting mirror 11. That is, if an inclination occurs in the plane reflecting mirror 11, since a position of a beam is not deviated in the position of the aperture 23, a loss due to an eclipse is not generated.

Therefore, in a laser resonator with such a configuration, since an eclipse due to an aperture does not occur regardless of an inclination amount of the plane reflecting mirror 11, a stable resonator can be configured in which decline of a laser output due to a misalignment is prevented and degradation of a laser beam due to diffraction of an eclipse is prevented.

Further, although the aperture 23 is arranged in the position of $L_p$ in the above-mentioned example, an optical component such as a polarizer, a wave plate, an EO-Q switch, AO-Q switch or the like may be arranged. With such an arrangement, since an eclipse due to an aperture of an optical component does not occur regardless of an inclination amount of the plane reflecting mirror 11, a stable resonator can be configured in which decline of a laser output due to a misalignment is prevented and degradation of a laser beam due to diffraction of an eclipse is prevented.

In addition, an output coupling device for taking out a part of a laser may be arranged instead of the aperture 23. With such an arrangement, since an emission position of an outputted laser beam does not change more than an inclination amount of the plane reflecting mirror 11 and an influence of a resonating mode imparted to an angle deviation is small, a laser resonator with good stability of an emission position of a laser can be configured.

Embodiment 4

Figure 12:
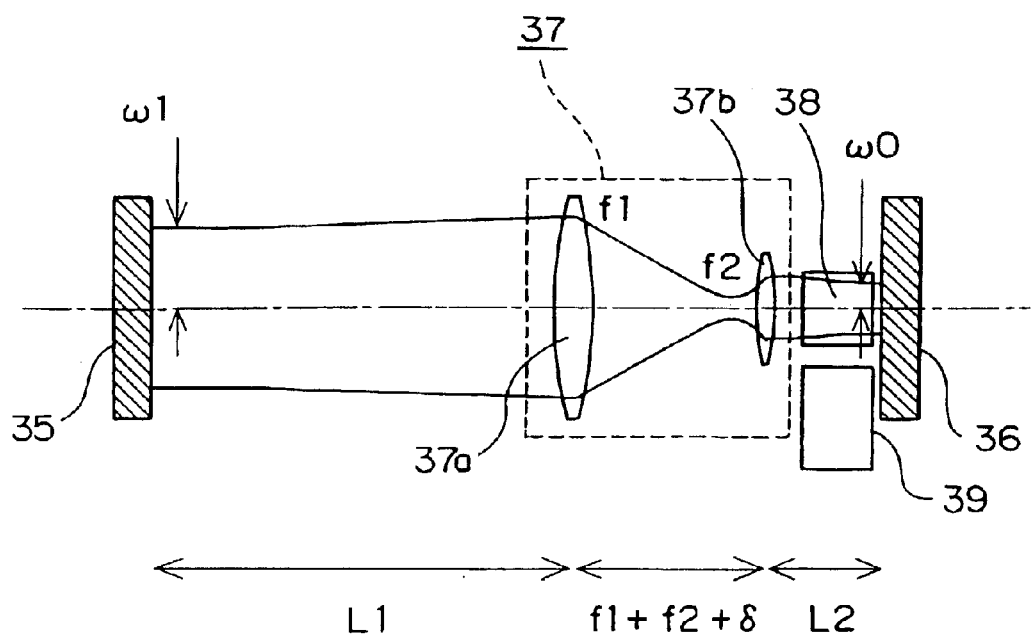
FIG. 12 is a schematic view showing the construction of a laser resonator according to a fourth embodiment of the present invention.

The description will herein below be given with respect to a laser resonator in accordance with Embodiment 4 of the present invention with reference to drawings. FIG. 12 is a schematic view showing a configuration of a laser resonator in accordance with Embodiment 4 of the present invention.

In FIG. 12, reference numerals 35 and 36 denote plane reflecting mirror, reference numeral 37 denotes a telescope having lenses 37a and 37b, reference numeral 38 denotes a laser material, and reference numeral 39 denotes an exciting light source for exciting the laser material 38.

The plane reflecting mirrors 35 and 36 are arranged opposing each other, and the laser material 38 is disposed on the side of the plane reflecting mirror 36. The telescope 37 is arranged between the plane reflecting mirror 35 and the laser material 38, and a focal length of the lens 37a of the telescope 37 is $f_1$, a focal length of the lens 37b of the telescope 37 is $f_2$ and an interval between the lens 37a and the lens 37b is $f_1+f_2+\delta$. In addition, $|f_1/f_2|>1$. A distance between the lens 37a and the plane reflecting mirror 35 is $L_1$, and a distance between the lens 37b and the plane reflecting mirror 36 is $L_2$.

Operations of the laser resonator in accordance with the Embodiment 4 will now be described. A laser beam emitted from the laser material 38 to the direction of the telescope 37 is magnified by the telescope 37 and propagated, and is reflected by the plane reflecting mirror 35 to the direction opposite the incident laser beam. The laser beam reflected by the plane reflecting mirror 35 is reduced by the telescope 37, and is incident in the laser material 38 again. Moreover, the laser beam incident in the laser material 38 is reflected by the plane reflecting mirror 36, incident in the laser material 38 again, and is further amplified by the laser material 38. That is, the laser beam emitted from the laser material 38 goes back and forth the same optical path and returns to the laser material 38, and is confined in the laser resonator.

A size of a resonating mode in the resonator will now be considered. When $L'=L_1-f_1=L_0/2$, $f_1/f_2=M$, and $f_1^2/\delta=R_0$, concerning a beam size $\omega_0$ in a position of the plane reflecting mirror 36 and a beam size $\omega_1$ in the plane reflecting mirror 35, an arbitrary beam size $\omega_0$ is obtained by using a telescope satisfying appropriate $f_1/f_2=M$ with respect to arbitrary $L_0$ as in Expression (6). In addition, a deviation amount when an inclination $\theta$ is occurred in the plane reflecting mirror 35 is the same as that in Expression (7).

In addition, the effective Fresnel number Nf of the resonator is given in the same manner as in Expression A2. When it is assumed that a=0.375, L'=1 m, and M=4, Nf=1.5. Since the Fresnel number exceeds 0.7, from FIG. 23, a loss to the basic mode decreases and it becomes possible to obtain stable laser oscillation. Further, a loss to the higher mode is large and it is possible to suppress oscillation of the higher mode to obtain a laser output of a high beam quality.

Therefore, in a laser resonator with such a configuration, since a telescope with an appropriate magnification M to a length of the resonator can be selected, a stable resonator having a small beam size with a large length can be configured. In addition, since the effective Fresnel number increases, a loss to the basic mode decreases and stable laser oscillation can be obtained. Further, since a loss to the higher mode is large and oscillation of the higher mode can be suppressed, a laser output of a high beam quality can be obtained. In addition, since an influence of an inclination of a plane reflecting mirror configuring the resonator is small, a stable resonator can be configured in which decline of a laser output due to misalignment is prevented and degradation of a laser beam due to diffraction of an eclipse is also prevented. Moreover, since the number of optical components is approximately a half of those shown in FIG. 1, a circulation loss of the resonator is reduced and utilization efficiency of a laser beam can be improved.

Embodiment 5

Figure 13:
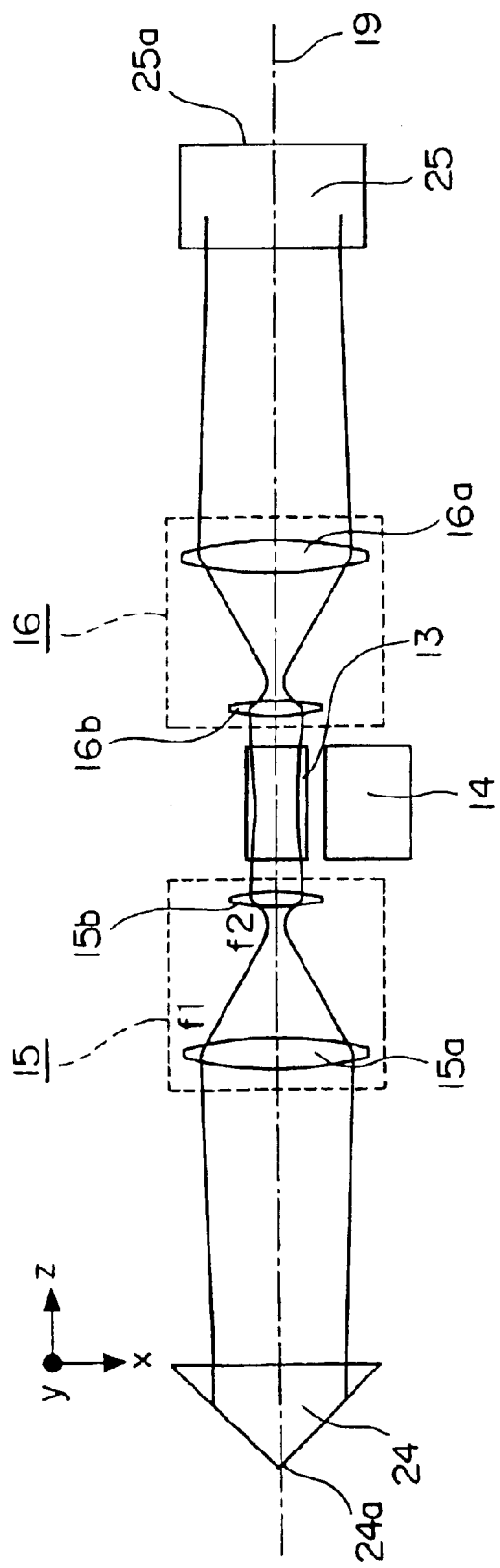
FIG. 13 is a schematic view showing the construction of a laser resonator according to a fifth embodiment of the present invention.

The description will hereinbelow be given with respect to a laser resonator in accordance with Embodiment 5 of the present invention with reference to drawings. FIG. 13 is a schematic view showing a configuration of a laser resonator in accordance with Embodiment 5 of the present invention.

In FIG. 13, reference numeral 24 denotes a roof prism having an edge line 24a that is parallel to the y axis, and reference numeral 25 denotes a roof prism having an edge line 25a that is parallel to the x axis. Other configurations are the same as those in Embodiment 1.

Figure 14:
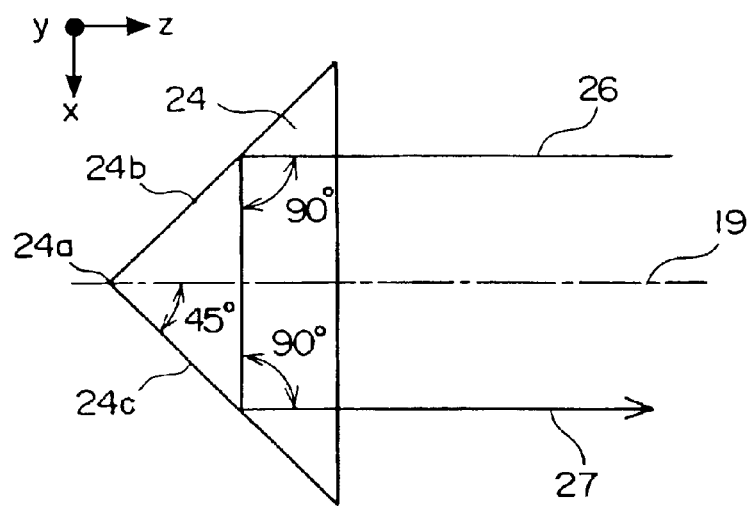
FIG. 14 is a schematic view showing the reflection state of a laser beam which is made incident to a rood prism of the laser resonator according to the fifth embodiment of the present invention.

Operations of a roof prism used in the laser resonator in accordance with Embodiment 5 will now be described. FIG. 14 is a schematic view showing a reflection state of a laser beam incident on the roof prism 24 of FIG. 13.

In FIG. 14, reflection faces 24b and 24c sandwiching the edge line 24a are fixed perpendicular to each other, and forms an angle of 45 degrees with an optical axis 19. A laser beam that travels on an optical path 26 parallel to the optical axis 19 and is incident on the roof prism 24 is given changes of direction of a total 180 degrees consisting of 90 degrees by the reflection face 24b and 90 degrees by the reflection face 24c. An optical path 27 of the laser beam reflected in this way is also parallel to the optical axis 19. That is, the roof prism 24 reflects an incident laser beam as a laser beam that is parallel to the incident laser beam and travels in an opposite direction.

Figure 15:
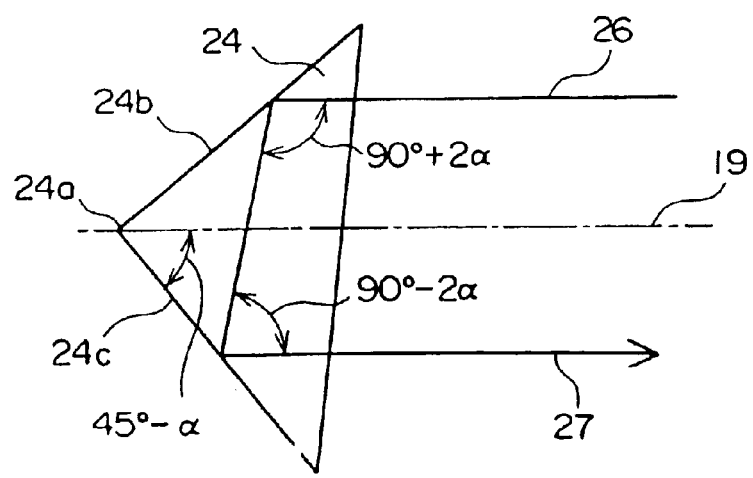
FIG. 15 is a schematic view showing the state in which the rood prism of the laser resonator according to the fifth embodiment of the present invention is inclined.

In addition, as shown in FIG. 15, when the roof prism 24 inclines a degree with the edge line 24a as a central axis, an angle variation given by the reflection face 24b is $90°+2\alpha$ and an angle variation given by the reflection face 24c is $90°-2\alpha$, which makes a total angle variation 180 degrees between the laser beam travelling on the optical path 26 and the laser beam reflected by the roof prism 24 and travelling on the optical path 27. Therefore, even if an inclination with the edge line 24a as a central axis occurs, the roof prism 24 reflects an incident laser beam as a laser beam that is parallel to the incident laser beam and travels in an opposite direction.

Moreover, in the case in which an incident laser beam inclines with respect to the optical axis 19, the roof prism 24 also reflects the incident laser beam as a laser beam that is parallel to the incident laser beam and travels in an opposite direction. Further, although the optical paths 26 and 27 are shown as shifted from the optical axis 19 in FIGS. 14 and 15 for illustration purpose, in practice, a center of a beam of either the optical path 26 or the optical path 27 coincides with the optical path 19, and a laser beam is irradiated on an area including the edge line 24a and reflected.

Moreover, as shown in FIG. 13, by arranging the edge line 24a of the roof prism 24 and the edge line 25a of the roof prism 25 in directions perpendicular to each other, inclinations of the roof prisms 24 and 25 are compensated for each other.

Therefore, in a laser resonator with such a configuration, since inclinations of the roof prisms 24 and 25 are compensated for each other, a stable resonator can be configured in which decline of a laser output due to misalignment is prevented.

Embodiment 6

Figure 16:
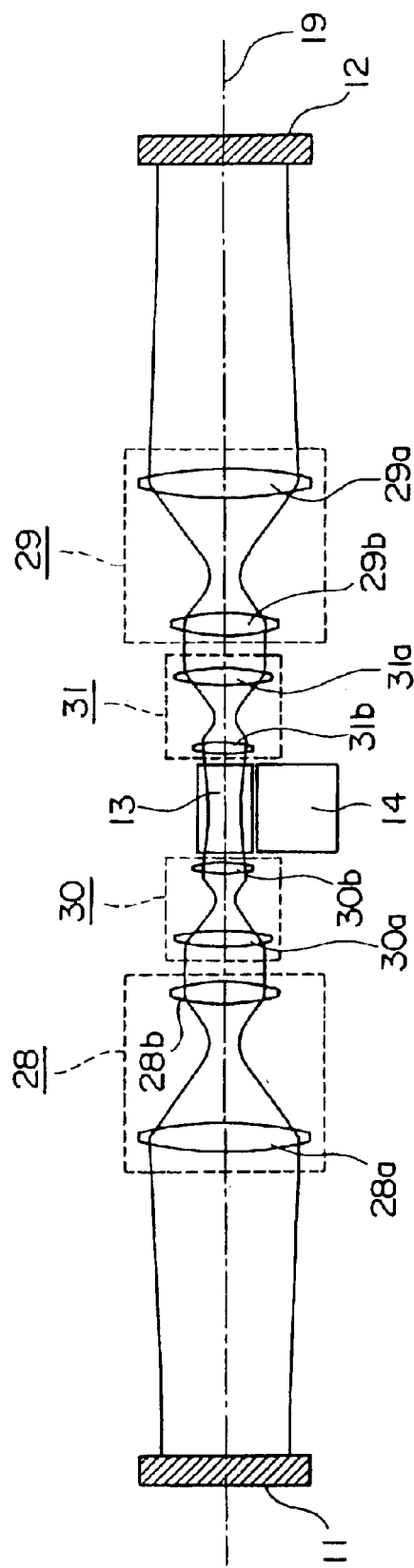
FIG. 16 is a schematic view showing the construction of a laser resonator according to a sixth embodiment of the present invention.

The description will hereinbelow be given with respect to a laser resonator in accordance with Embodiment 6 of the present invention with reference to drawings. FIG. 16 is a schematic view showing a configuration of a laser resonator in accordance with Embodiment 6 of the present invention.

In FIG. 16, reference numeral 28 denotes a telescope having lenses 28a and 28b, reference numeral 29 denotes a telescope having lenses 29a and 29b, reference numeral 30 denotes a telescope having lenses 30a and 30b, and reference numeral 31 denotes a telescope having lenses 31a and 31b. Other configurations are the same as those of the above-mentioned Embodiment 1.

A focal length of the lens 28a of the telescope 28 is $f_1$, a focal length of the lens 28b of the telescope 28 is $f_2$, and an interval between these lenses 28a and 28b is $f_1+f_2+\delta_1$. Further, $|f_1/f_2|>1$.

In addition, a focal length of the lens 30a of the telescope 30 is $f_3$, a focal length of the lens 30b of the telescope 30 is $f_4$, and an interval between these lenses 30a and 30b is $f_3+f_4+\delta_2$. Further, $|f_3/f_4|>1$.

Identical telescopes are used as the telescope 28 shown on the left side of the figure and the telescope 29 shown on the right side, which are arranged in symmetry with a laser material 13 as a center. In addition, identical telescopes are used as the telescope 30 shown on the left side of the figure and the telescope 31 on the right side, which are arranged in symmetry with the laser material 13 as a center, and the telescope 30 is arranged between the telescope 28 and the laser material 13 and the telescope 31 is arranged between the telescope 29 and the laser material 13, respectively.

The lens 28a and the plane reflecting mirror 11 as well as the lens 29a and the plane reflecting mirror 12 arranged such that distances between the lenses and the plane reflecting mirrors are $L_1$ respectively. In addition, the lens 28b and the lens 30a as well as the lens 29a and the lens 31a are arranged such that distances between the pairs of lenses are $L_2$ respectively. Further, the lens 30b and the resonator as well as the lens 31b and the resonator are arranged such that distances between the lenses and centers of the resonators are $L_3$ respectively.

Operations of the laser resonator in accordance with Embodiment 6 will now be described. A laser beam emitted from the laser material 13 in the direction of the telescope 30 is magnified by the telescope 30 and propagates, and is incident on the telescope 28. The laser beam incident on the telescope 28 is magnified by the telescope 28 and propagates, and is reflected by the plane reflecting mirror 11 in the direction opposite to the incident laser beam.

The laser beam reflected by the plane reflecting mirror 11 is reduced by the telescope 28 and the telescope 30, and is incident on the laser material 13 again. Moreover, the laser beam incident on the laser material 13, after passing through the laser material 13 and amplified, is magnified by the telescopes 31 and 29 and propagates, and is reflected by the plane reflecting mirror 12 in the direction opposite to the incident laser beam.

The laser beam reflected by the plane reflecting mirror 12 is reduced by the telescope 29 and the telescope 31, incident on the laser material 13 again, and is further amplified by the laser material 13. That is, the laser beam emitted from the laser material 13 goes back and forth the same optical path and returns to the laser material 13, and is confined in the laser resonator.

A size of a resonating mode in the resonator will now be considered. When $L'=L_1-f_1=L_0/2$, $f_1/f_2=M_1$, $f_1^2/\delta=R_0$, and $f_3/f_4=M_2$, a beam size $\omega_0$ in a central position of the resonator and a beam size $\omega_1$ in the plane reflecting mirror 11 are represented by Expression (12) shown below. Further, for simplification of the expression, $L_2=f_2+f_3$, $L_3=f_4$, $\delta_2=0$.

$$\omega_0^4 = \left(\frac{\lambda \frac{f_1^2}{\delta}}{\pi}\right)^2 \left(\frac{2L'}{2\frac{f_1^2}{\delta}-2L'}\right)\left(\frac{f_2}{f_1}\cdot\frac{f_4}{f_3}\right)^4$$

$$= \frac{1}{(M_1 M_2)^4}\left(\frac{\lambda \cdot R_0}{\pi}\right)^2 \left(\frac{L_0}{2R_0-L_0}\right)$$

$$\omega_1^4 = \omega_2^4 = \left(\frac{\lambda}{\pi}\right)^2 \frac{2L'\left(2\frac{f_1^2}{\delta}-2L'\right)}{4}$$

$$= \left(\frac{\lambda}{\pi}\right)^2 \frac{L_0(2R_0-L_0)}{4}$$

(Expression 12)

Comparing with Expression (6), Expression (12) is in the form in which M in Expression (6) is replaced with $(M_1\times M_2)$. That is, if the telescope 30 and the telescope 31 are inserted in the resonator, a size of the resonating mode at the center of the resonator before the insertion is reduced by $1/M_2$ times. In addition, changes of a beam size and a beam with respect to an optical axis due to an inclination of the plane reflecting mirror 11 maybe found by replacing M in Expression (7) with $(M_1\times M_2)$. That is, a resonating mode of an arbitrary beam size $\omega_0$ can be given by a combination of $M_1$ and $M_2$.

In a laser resonator with such a configuration, since an arbitrary beam size of a resonating mode can be given by combining telescopes with appropriate magnifications $M_1$ and $M_2$ to a length of a resonator, a stable resonator having a small beam size with a large length can be configured. In addition, since an influence of an inclination of a plane reflecting mirror configuring the resonator is small, a stable resonator can be configured in which decline of a laser output due to misalignment is prevented and degradation of a laser beam due to diffraction of an eclipse is also prevented.

In addition, since the magnification changes from $(M_1\times M_2)$ to $M_1$ by removing the telescope 30 and the telescope 31, the beam size $\omega_0$ in a center of the resonator can be made larger. Therefore, a laser resonator having two kinds of beam sizes $\omega_0$ in one body can be configured. If the beam size $\omega_0$ is changed on the laser material 13, an output of a laser beam, a beam quality, a pulse width and the like change.

In a laser resonator with such a configuration, since two kinds of beam sizes of a resonating mode can be given, a laser resonator can be configured in which an output of a laser beam, a beam quality and a pulse width can be changed.

Figure 17:
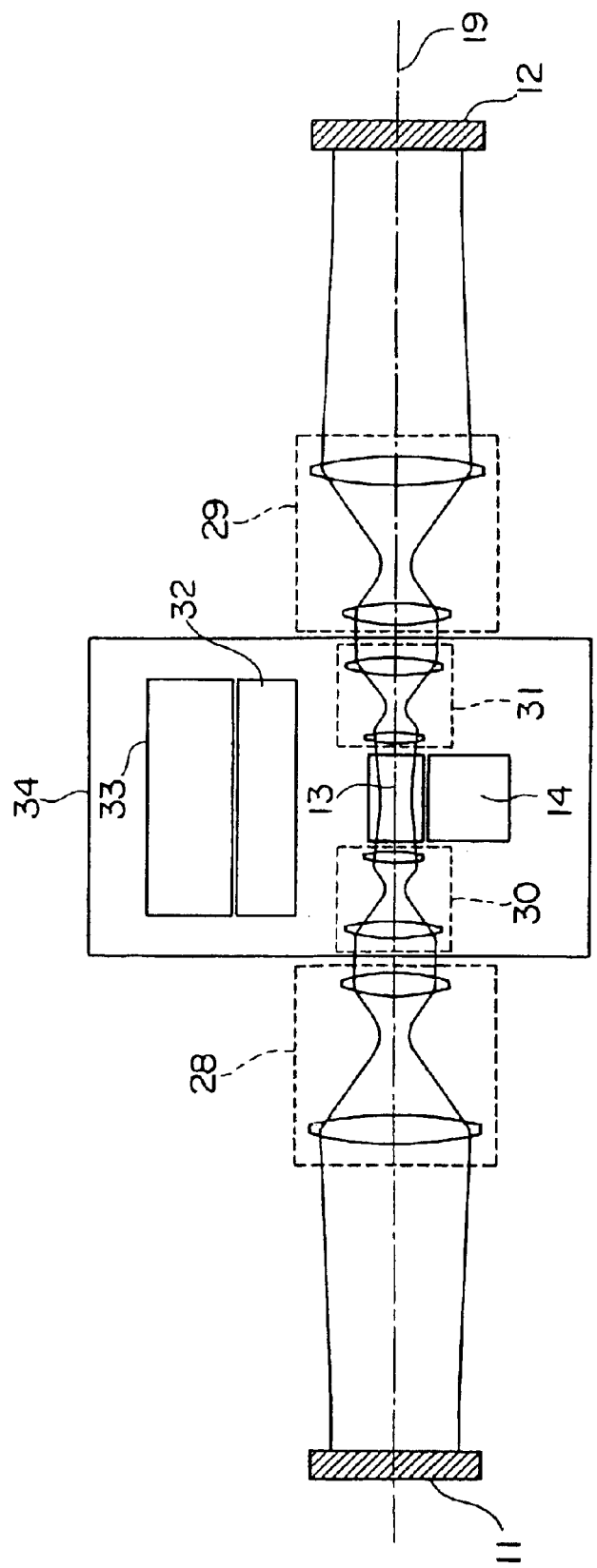
FIG. 17 is a schematic view showing another construction of the laser resonator according to a sixth embodiment of the present invention.
Figure 18:
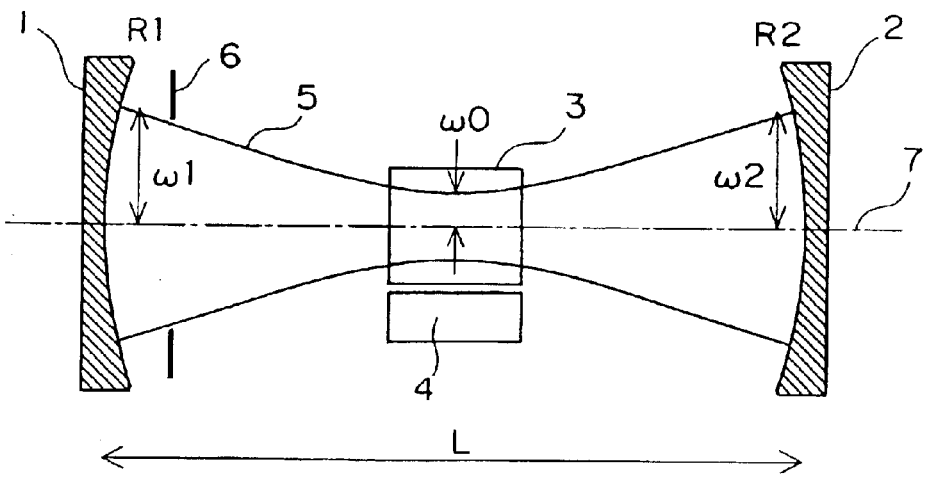
FIG. 18 is a schematic view showing the construction of a conventional laser resonator.
Figure 19:
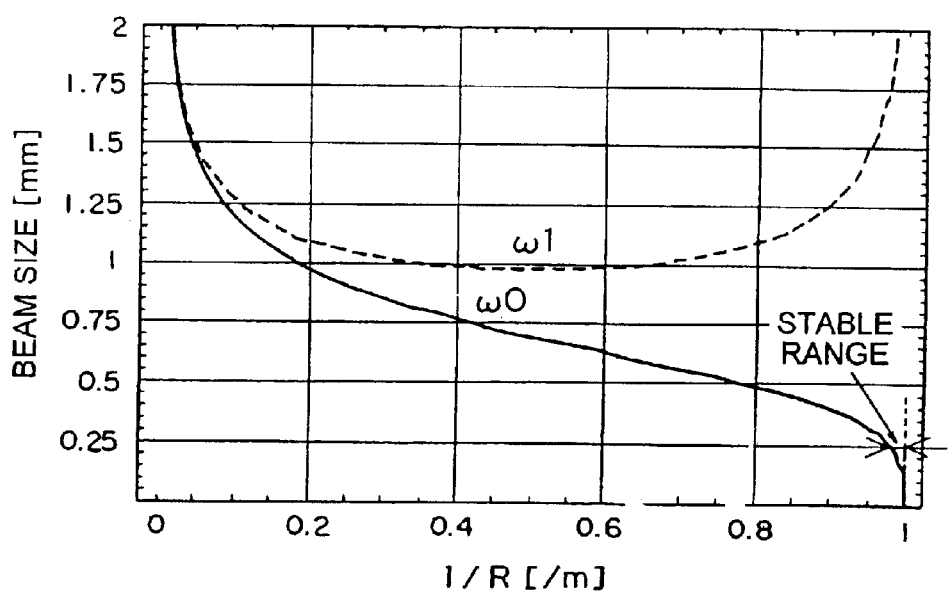
FIG. 19 is a graphical representation explaining the beam size of the conventional laser resonator.
Figure 20:
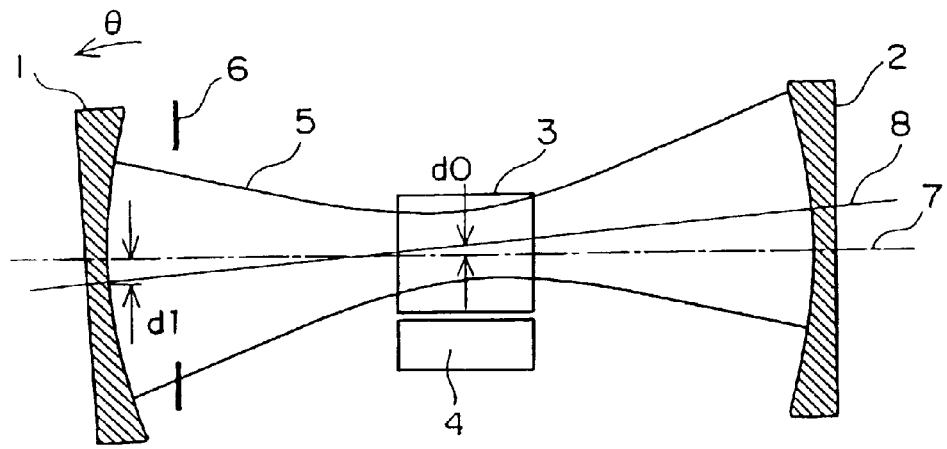
FIG. 20 is a schematic view showing the resonance mode when a concave reflecting mirror of the conventional laser resonator is inclined.
Figure 21:
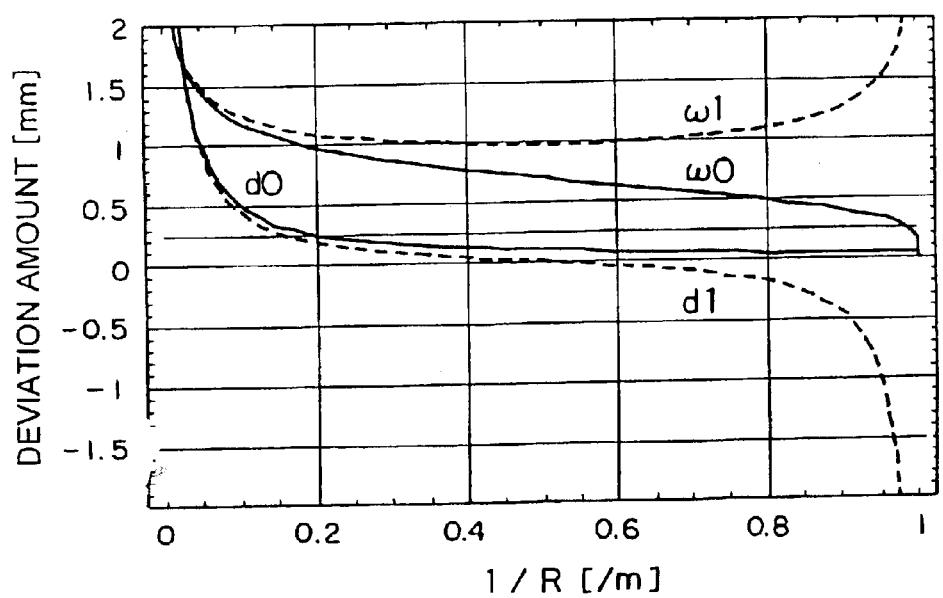
FIG. 21 is a graphical representation explaining the misalignment amount between an optical axis of the laser resonator shown in FIG. 20 and an axis of the resonance mode.
Figure 22:
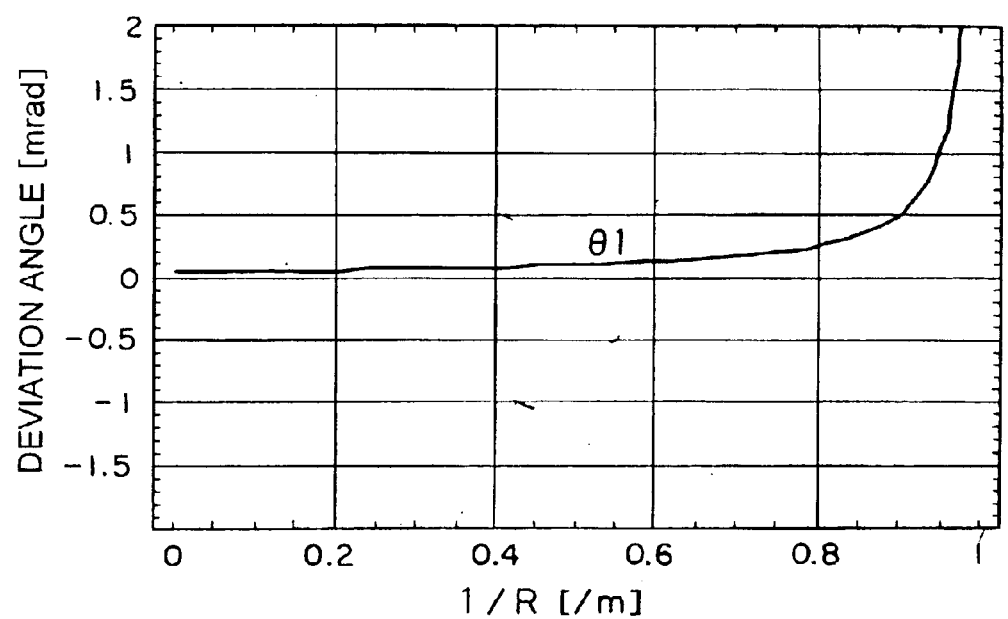
FIG. 22 is a graphical representation explaining the misalignment angle between the optical axis of the laser resonator shown in FIG. 20 and the axis of the resonance mode.

In addition, as shown in FIG. 17, the telescope 30, the telescope 31, the laser material 13 and the exciting light source 14 may be removed, and a laser material 32 and an exciting light source 33 of different sizes or different materials may be inserted using a replacing apparatus 34. In a laser resonator with such a configuration, since two kinds of beam sizes of a resonating mode can be given to different laser materials, a laser resonator can be configured in which a wave length, an output, a beam quality, a pulse width or the like of a laser beam can be changed.

In addition, although four telescopes are used in the above-mentioned example, 2 m telescopes (m is an integer) may be symmetrically arranged. With such a configuration, since m kinds of beam sizes $\omega_0$ can be obtained, a laser resonator can be configured in which an output of a laser beam, a beam quality and a pulse with in m kinds of ways can be changed.

Further, the parts described referring to a plane reflecting mirror as reflecting means in each of the above-mentioned embodiments may be read as referring to a concave reflecting mirror.

What is claimed is:

1. A laser resonator comprising:
   a laser material for being excited by a light source to amplify optically a laser beam;
   a first telescope for magnifying the laser beam which has been made incident from said laser material and for reducing the laser beam which has been made incident from the opposite side to the side of said laser material;
   first reflecting means for reflecting the laser beam, which has been made incident from said first telescope in the direction opposite to the incident direction;
   a second telescope which is arranged in such a way as to face said first telescope with said laser material sandwiched between said first telescope and said second telescope and which serves to magnify the laser beam which has been reflected by said first reflected means to be reduced by said first telescope and to be amplified by said laser material to be made incident thereto and also serves to reduce the laser beam which has been made incident from the opposite side to the side of said laser material; and
   second reflecting means which is arranged in such a way as to face said first reflecting means with said laser material sandwiched between said first reflecting means and said second I reflecting means and which serves to reflect the laser beam, which has been made incident from said second telescope, in the opposite direction to the incident direction, wherein magnifications of said first and second telescopes are set such that a loss to a lower mode decreases and a loss to a higher mode increases in the resonator.

2. A laser resonator according to claim 1, wherein said first reflecting means is comprised of a first roof prism having two reflecting surfaces intersecting perpendicularly to each other and a first edge line defined between said two reflecting surfaces;

said second reflecting means is comprised of a second roof prism having two reflecting surfaces intersecting perpendicularly to each other and a second edge line defined between said two reflecting surfaces; and said first and second roof prisms are arranged in such a way that said first and second edge lines intersect perpendicularly to each other.

3. A laser resonator according to claim 1, wherein each of said telescopes includes a first lens, the first lenses arranged on opposite sides of said laser material and each first lens has a positive focal length $f_1$, and a second lens, the second lenses arranged on opposite sides of said laser material and each second lens has a negative focal length $f_2$, and where each set of first lens and second lens fulfills the relationship of $|f_1/f_2|>1$.

4. A laser resonator according to claim 1, wherein a polarizer is arranged on an optical path between each of said reflecting means and said telescope(s) arranged on the side of said reflecting means.

5. A laser resonator according to claim 1, wherein a birefringent device is arranged on the optical path between each of said reflecting means and said telescope(s) arranged on the side of said reflecting means.

6. A laser resonator according to claim 1, wherein said laser material has the thermal lens effect.

7. A laser resonator according to claim 1, wherein said laser material has the thermal lens effect to which has two different focal lengths within the face perpendicular to an optical axis of said laser resonator.

8. A laser resonator according to claim 1, wherein said laser material uses any one of (Er: Glass), (Er, Yb: Glass), (Er: YAG), (Tm: YAG), (Tm, Ho: YAG), (Ho: YLF) or (Tm, Ho: YLF).

9. A laser resonator according to claim 1, wherein a size of a section of said laser material perpendicular to a light source is $2a$, a magnification of said first and second telescopes is M, and when a wave length of a laser beam is $\lambda$ and a resonator length is L, $(a^2/\lambda L)<0.7$, and wherein $0.7 \leq \{(Ma)^2/\lambda L\} \leq 3$ is satisfied.

10. A laser resonator comprising:

a laser material for being excited by a light source to amplify optically a laser beam;

a single telescope for magnifying the laser beam which has been made incident from said laser material and for reducing the laser beam which has been made incident from the opposite side to the side of said laser material;

first reflecting means for reflecting the laser beam, which has been made incident from said first telescope in the direction opposite to the incident direction; and second reflecting means which is arranged in such a way as to face said first reflecting means with said laser material sandwiched between said first reflecting means and said second reflecting means and which serves to reflect the laser beam, which has been reflected by said first reflecting means to be reduced by said telescope and to be amplified by said laser material to be made incident thereto, in the opposite direction to the incident direction, wherein a magnification of said telescope is set such that a loss to a lower mode decreases and a loss to a higher mode increases in the resonator.

11. A laser resonator according to claim 10, wherein a size of a section of said laser material perpendicular to a light source is $2a$, a magnification of said telescope is M, and when a wave length of a laser beam is $\lambda$ and a resonator length is L, $(a^2/\lambda L)<0.7$, and wherein $0.7 \leq \{(Ma)^2/\lambda L\} \leq 3$ is satisfied.

12. A laser resonator comprising:

a laser material for being excited by a light source to amplify optically a laser beam;

a first telescope for magnifying the laser beam which has been made incident from said laser material and for reducing the laser beam which has been made incident from the opposite side to the side of said laser material;

a second telescope for magnifying the laser beam which has been made incident from said first telescope and for reducing the laser beam which has been made incident from the opposite side to the side of said first telescope;

first reflecting means for reflecting the laser beam, which has been made incident from said second telescope, in the opposite direction to the incident direction;

a third telescope which is arranged in such a way as to face said first telescope with said laser material sandwiched between said first telescope and said second telescope and which serves to magnify the laser beam which has been reflected by said first reflecting means to be reduced by said first and second telescopes and to be amplified by said laser material to be made incident thereto and also serves to reduce the laser beam which has been made incident from the opposite side to the side of said laser material;

a fourth telescope which is arranged in such a way as to face said second telescope with said laser material sandwiched between said second telescope and said fourth telescope and which serves to magnify the laser beam which has been made incident from said third telescope and to serve to reduce the laser beam which has been made incident from the opposite side to the side of said third telescope; and second reflecting means which is arranged in such a way as to face said first reflecting means with said laser material sandwiched between said first reflecting means and said second reflecting means and which serves to reflect the laser beam, which has been made incident from said fourth telescope, in the opposite direction to the incident direction, wherein magnifications of said first, second, third and fourth telescopes are set such that a loss to a lower mode decreases and a loss to a higher mode increases in the resonator.

13. A laser resonator according to claim 12, wherein said first telescope and said third telescope are detachable.

14. A laser resonator according to claim 12, further comprising a switching device having a second laser material for being excited by a second light source to amplify optically the laser beam, wherein said laser material, said first telescope, and said third telescope are all detached, and said switching device is arranged roughly at the center of said resonator.

15. A laser resonator according to claim 12,
wherein a size of a section of said laser material perpendicular to a light source is 2*a*,
a magnification of said first and third telescopes is M1 and a magnification of said second and fourth telescopes is M2, and
when a wave length of a laser beam is $\lambda$ and a resonator length is L, $(a^2/\lambda L)<0.7$, and
wherein $0.7 \leq \{(M1 \times M2 \times a)^2/\lambda L\}3$ is satisfied.

16. A laser resonator comprising:
a laser material for being excited by alight source to amplify optically a laser beam;
a first telescope for magnifying the laser beam which has been made incident from said laser material and for reducing the laser beam which has been made incident from the opposite side to the side of said laser material;
first reflecting means for reflecting the laser beam, which has been made incident from said first telescope in the direction opposite to the incident direction;
a second telescope which is arranged in such a way as to face said first telescope with said laser material sandwiched between said first telescope and said second telescope and which serves to magnify the laser beam which has been reflected by said first reflecting means to be reduced by said first telescope and to be amplified by said laser material to be made incident thereto and also servers to reduce the laser beam which has been made incident from the opposite side to the side of said laser material; and
second reflecting means which is arranged in such a way as to face said first reflecting means with said laser material sandwiched between said first reflecting means and said second reflecting means and which serves to reflect the laser beam, which has been made incident from said second telescope, in he opposite direction to the incident direction,
wherein each of said telescopes includes: a firs lens which is arranged on the opposite side to the side of said laser material and has a focal length $f_1$; and a second lens which is arranged on the side of said laser material and has a focal length $f_2$, and fulfills the relationship of $|f_1/f_2|>1$,
an aperture for selecting among the resonator modes is arranged between said first reflecting means and said telescopes (s) arranged on the side of said first reflecting means, and
when a distance between said first reflecting means and said telescope(s) arranged on the side of said first reflecting means is $L_1$, and a distance between said first lens of said telescope arranged on the side of said first reflecting means and said second lens is $f_1+f_2+\delta$, a distance between said first reflecting means and said aperture is $L_1-f_1-f_1 \times f_1/(2 \times \delta)$.

17. A laser resonator according to claim 16, wherein said aperture for selecting among the resonator modes is an optical component.

18. A laser resonator according to claim 16, wherein instead of said aperture for selecting among the resonator modes, an output coupling device for taking out a part if the laser beam to the outside is arranged.

* * * * *